United States Patent

(12) United States Patent
Lee et al.

(10) Patent No.: US 12,475,845 B2
(45) Date of Patent: Nov. 18, 2025

(54) PIXEL AND DISPLAY DEVICE INCLUDING THE SAME

(71) Applicant: Samsung Display Co., Ltd., Yongin-si (KR)

(72) Inventors: Se Hyun Lee, Yongin-si (KR); Jin Joo Ha, Yongin-si (KR); Kwi Hyun Kim, Yongin-si (KR); Dong Woo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/613,749

(22) Filed: Mar. 22, 2024

(65) Prior Publication Data

US 2024/0404466 A1 Dec. 5, 2024

(30) Foreign Application Priority Data

May 31, 2023 (KR) ........................ 10-2023-0070046

(51) Int. Cl.

*G09G 3/3233* (2016.01)
*G09G 3/32* (2016.01)
*G09G 3/3266* (2016.01)
*G09G 3/3291* (2016.01)

(52) U.S. Cl.

CPC ............ *G09G 3/3233* (2013.01); *G09G 3/32* (2013.01); *G09G 3/3266* (2013.01); *G09G 3/3291* (2013.01); *G09G 2300/0426* (2013.01); *G09G 2300/0819* (2013.01); *G09G 2300/0861* (2013.01); *G09G 2310/0267* (2013.01)

(58) Field of Classification Search

None

See application file for complete search history.

(56) References Cited

U.S. PATENT DOCUMENTS

| | | | |
|---|---|---|---|
| 10,748,486 B2 | 8/2020 | Teraguchi |
| 11,211,000 B2 | 12/2021 | Miura et al. |
| 11,527,595 B2 | 12/2022 | Tsuboi |
| 11,551,617 B2 | 1/2023 | Kimura et al. |

(Continued)

FOREIGN PATENT DOCUMENTS

| | | | |
|---|---|---|---|
| JP | 2001230425 A * | 8/2001 |
| JP | 6867737 B2 | 5/2021 |

(Continued)

*Primary Examiner* — Shaheda A Abdin

(74) *Attorney, Agent, or Firm* — Innovation Counsel LLP

(57) ABSTRACT

A pixel includes: a first transistor including a first electrode connected to a first node, a second electrode connected to a second node, and a gate electrode connected to a third node; a second transistor connected between a data line and the second node, the second transistor including a gate electrode electrically connected to a first scan line; a third transistor connected between a first power line to which a voltage of a first driving power source is supplied and the first node, the third transistor including a gate electrode electrically connected to an emission control line; a first capacitor connected between the first node and the third node; a second capacitor connected between the second node and the third node; and a light emitting element connected between the second node and a second power line to which a voltage of a second driving power source is supplied.

19 Claims, 18 Drawing Sheets

(56) References Cited

U.S. PATENT DOCUMENTS

| | | | | |
|---|---|---|---|---|
| 2006/0049467 | A1* | 3/2006 | Lim | H01L 21/743 257/E29.267 |
| 2012/0293478 | A1* | 11/2012 | Chaji | G09G 3/006 345/212 |
| 2015/0138253 | A1* | 5/2015 | Kimura | G09G 3/3283 345/77 |
| 2016/0012780 | A1* | 1/2016 | Lee | G09G 3/3291 315/172 |
| 2019/0019458 | A1* | 1/2019 | Teraguchi | H10K 59/123 |
| 2019/0197957 | A1* | 6/2019 | Miura | H10K 59/121 |
| 2020/0320930 | A1* | 10/2020 | Toyotaka | G09F 9/30 |
| 2021/0242292 | A1* | 8/2021 | Tsuboi | G09G 3/3233 |
| 2023/0068950 | A1* | 3/2023 | Nikonov | H10D 30/6215 |

FOREIGN PATENT DOCUMENTS

| | | | |
|---|---|---|---|
| JP | 2021-120700 | A | 8/2021 |
| JP | 7031583 | B2 | 3/2022 |
| KR | 10-2297000 | B1 | 9/2021 |

* cited by examiner

PIXEL AND DISPLAY DEVICE INCLUDING THE SAME

CROSS-REFERENCE TO RELATED APPLICATION

The present application claims priority under 35 U.S.C. § 119(a) to Korean patent application No. 10-2023-0070046 filed on May 31, 2023, in the Korean Intellectual Property Office, the entire disclosure of which is incorporated herein by reference.

BACKGROUND

1. Technical Field

The present disclosure generally relates to a pixel and a display device including the same.

2. Related Art

With the development of information technologies, the importance of a display device which is a connection medium between a user and information increases. Accordingly, display devices such as a liquid crystal display device and an organic light emitting display device are increasingly used.

Recently, a Head Mounted Display Device (HMD) has been developed. The HMD is a display device which a user wears in the form of glasses or a helmet, thereby implementing Virtual Reality (VR) or Augmented Reality (AR), in which a focus is formed at a distance close to eyes. A high-resolution panel is applied to the HMD, and accordingly, a pixel which can be applied to the high-resolution panel is required.

SUMMARY

Embodiments provide a pixel which can be applied to a high-resolution panel, and a display device including the pixel.

In accordance with an aspect of the present disclosure, there is provided a pixel including: a first transistor including a first electrode connected to a first node, a second electrode connected to a second node, and a gate electrode connected to a third node; a second transistor connected between a data line and the third node, the second transistor including a gate electrode electrically connected to a first scan line; a third transistor connected between a first power line to which a voltage of a first driving power source is supplied and the first node, the third transistor including a gate electrode electrically connected to an emission control line; a first capacitor connected between the first node and the third node; a second capacitor connected between the second node and the third node; and a light emitting element connected between the second node and a second power line to which a voltage of a second driving power source is supplied.

The pixel may further include a fourth transistor including a first electrode connected to the second node, a second electrode electrically connected to a third power line to which a voltage of an initialization power source is supplied, and a gate electrode electrically connected to a second scan line.

The light emitting element may be turned off when the voltage of the initialization power source is supplied to the second node.

The third power line may be the same power line as the second power line, and the initialization power source may be the same power source as the second driving power source.

Each of the first transistor, the second transistor, the third transistor and the fourth transistor may be a MOSFET including a body electrode.

The voltage of the first driving power source may be supplied to the body electrode of each of the first transistor, the second transistor, the third transistor and the fourth transistor.

The body electrode of the first transistor may be electrically connected to the first node, and the voltage of the first driving power source may be supplied to the body electrode of each of the second transistor, the third transistor and the fourth transistor.

One horizontal period may include a first period, a second period, and a third period. During the first period, the second transistor, the third transistor, and the fourth transistor may be set to be in a turn-on state. During the second period, the second transistor and the fourth transistor may be set to be in the turn-on state, and the third transistor may be set to be in a turn-off state. During the third period, the third transistor and the fourth transistor may be set to be in the turn-on state, and the second transistor may be set to be in the turn-off state.

A voltage of a data signal may be supplied to the data line during the first period, the second period and the third period.

A voltage of a reference power source may be supplied to the data line during the first period and a portion of the second period, and a voltage of a data signal may be supplied to the data line during the rest of the second period and the third period.

One horizontal period may include a first period, a second period, and a third period. During the first period, the second transistor, the third transistor, and the fourth transistor may be set to be in a turn-on state. During the second period, the fourth transistor may be set to be in the turn-on state, and the second transistor and the third transistor may be set to be in a turn-off state. During the third period, the third transistor and the fourth transistor may be set to be in the turn-on state, and the second transistor may be set to be in the turn-off state. A voltage of a data signal may be supplied to the data line during the first period, the second period and the third period.

In accordance with another aspect of the present disclosure, there is provided a display device including: pixels connected to first scan lines, second scan lines, data lines, and emission control lines; wherein a pixel located on a ith (i is an integer of 0 or more) pixel row and a jth (j is an integer of 0 or more) pixel column includes: a first transistor including a first electrode connected to a first node, a second electrode connected to a second node, and a gate electrode connected to a third node; a second transistor connected to a jth data line and the third node, the second transistor being turned on when a first scan signal is supplied to an ith first scan line; a third transistor connected between a first power line to which a voltage of a first driving power source is supplied and the first node, the third transistor being turned off when an emission control signal is supplied to a kth (k is an integer of 0 or more) emission control line; a first capacitor connected between the first node and the third node; a second capacitor connected between the second node and the third node; and a light emitting element connected between the second node and a second power line to which a voltage of a second driving power source is supplied.

The pixel located on the ith pixel row and the jth pixel column may further include a fourth transistor including a first electrode connected to the second node and a second electrode electrically connected to a third power line to which a voltage of an initialization power source is supplied, the fourth transistor being turned on when a second scan signal is supplied to an ith second scan line.

The third power line may be the same power line as the second power line, and the initialization power source may be the same power source as the second driving power source.

Each of the first transistor, the second transistor, the third transistor and the fourth transistor may be a MOSFET including a body electrode, and the voltage of the first driving power source may be supplied to the body electrode.

Each of the first transistor, the second transistor, the third transistor and the fourth transistor may be a MOSFET including a body electrode, the body electrode of the first transistor may be electrically connected to the first node, and the voltage of the first driving power source may be supplied to the body electrode of each of the second transistor, the third transistor and the fourth transistor A horizontal period in which the pixel located on the ith pixel row and the jth pixel column is driven may include a first period, a second period, and a third period. The display device may further include: a first scan driver configured to supply the first scan signal to the ith first scan line during the first period and the second period; a second scan driver configured to supply the second scan signal to the ith second scan line during the first period, the second period and the third period; and an emission driver configured to supply the emission control signal to the kth emission control line during the second period.

The display device may further include a data driver configured to supply a voltage of a data signal to the jth data line during the first period, the second period and the third period.

The display device may further include a data driver configured to supply a voltage of a reference power source to the jth data line during the first period and a portion of the second period, and supply a voltage of a data signal to the jth data line during the rest of the second period and the third period.

A horizontal period in which the pixel located on the ith pixel row and the jth pixel column is driven may include a first period, a second period, and a third period. The display device may further include: a first scan driver configured to supply the first scan signal to the ith first scan line during the first period; a second scan driver configured to supply the second scan signal to the ith second scan line during the first period, the second period and the third period; an emission driver configured to supply the emission control signal to the kth emission control line during the second period; and a data driver configured to supply a voltage of a data signal to the jth data line during the first period, the second period and the third period.

BRIEF DESCRIPTION OF THE DRAWINGS

Example embodiments will now be described more fully hereinafter with reference to the accompanying drawings, however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
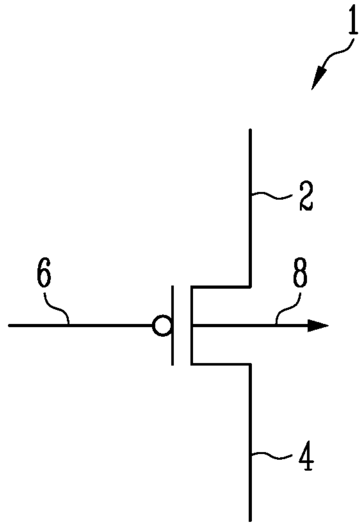
FIG. 1 is a diagram illustrating a transistor in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially' is omitted.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both electrical connection and physical connection, but the present disclosure is not necessarily limited thereto. For example, the term "connection" used based on circuit diagrams may mean electrical connection, and the term "connection" used based on sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

Meanwhile, the present disclosure is not limited to embodiments disclosed below, and may be implemented in various forms. Each embodiment disclosed below may be independently embodied or be combined with at least another embodiment prior to being embodied.

FIG. 1 is a diagram illustrating a transistor in accordance with an embodiment of the present disclosure.

Referring to FIG. 1, the transistor 1 in accordance with the embodiment of the present disclosure may include a first electrode 2, a second electrode 4, a gate electrode 6, and a body electrode 8. In an example, the transistor 1 may be a Metal-Oxide-Semiconductor Field-Effect Transistor (MOSFET). Since the transistor 1 (e.g., the MOSFET) including the body electrode 8 has a small mounting area, the transistor 1 is suitable for implementing a high-resolution pixel.

The transistor 1 may be formed on a silicon wafer. In an example, a transistor layer, a light emitting layer, a cover layer, and the like may be stacked on the silicon wafer, thereby implementing a panel. However, this is merely illustrative, and the transistor 1 may be formed on various substrates (e.g., a glass substrate) currently known in the art.

The first electrode 2 of the transistor T1 may be a source electrode, and the second electrode 4 of the transistor 1 may be a drain electrode. A threshold voltage of the transistor 1 may be changed by a body effect. The body effect means that the threshold voltage of the transistor T1 is changed due to a voltage difference between the first electrode 2 and the body electrode 8 of the transistor 1.

In the embodiment of the present disclosure, a pixel which enables threshold voltage compensation by using the transistor 1 including the body electrode 8. The body electrode 8 of the transistor T1 may be electrically connected to a body of a semiconductive layer through a doped region formed in the semiconductive layer. The doped region may be doped with a impurities different from a source region and a drain region of the transistor T1. For example, the source region and the drain region is doped with p-type impurities and the doped region is doped with n-type impurities, and vice versa.

Figure 2:
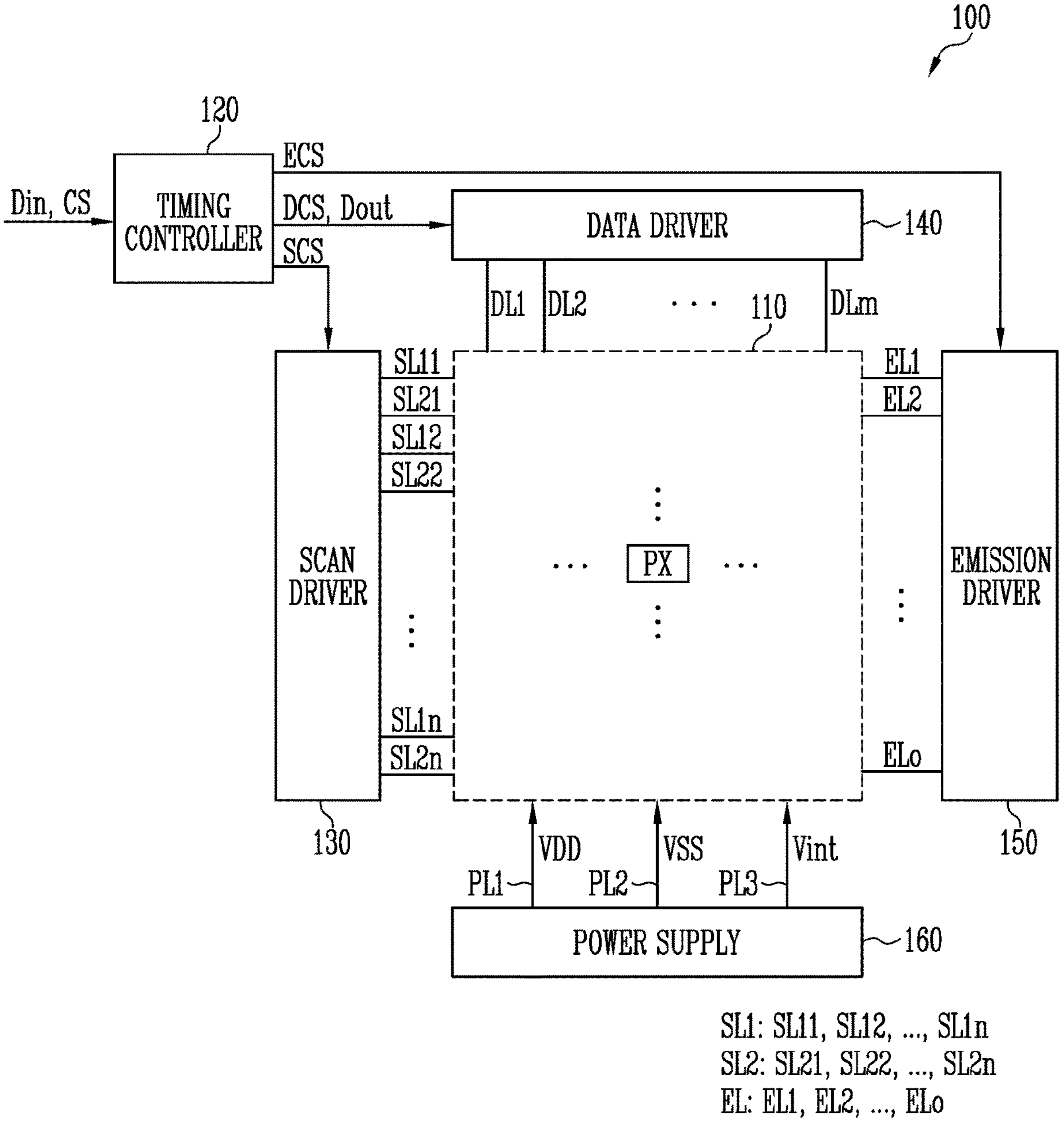
FIG. 2 is a diagram illustrating a display device in accordance with an embodiment of the present disclosure.
Figure 3:
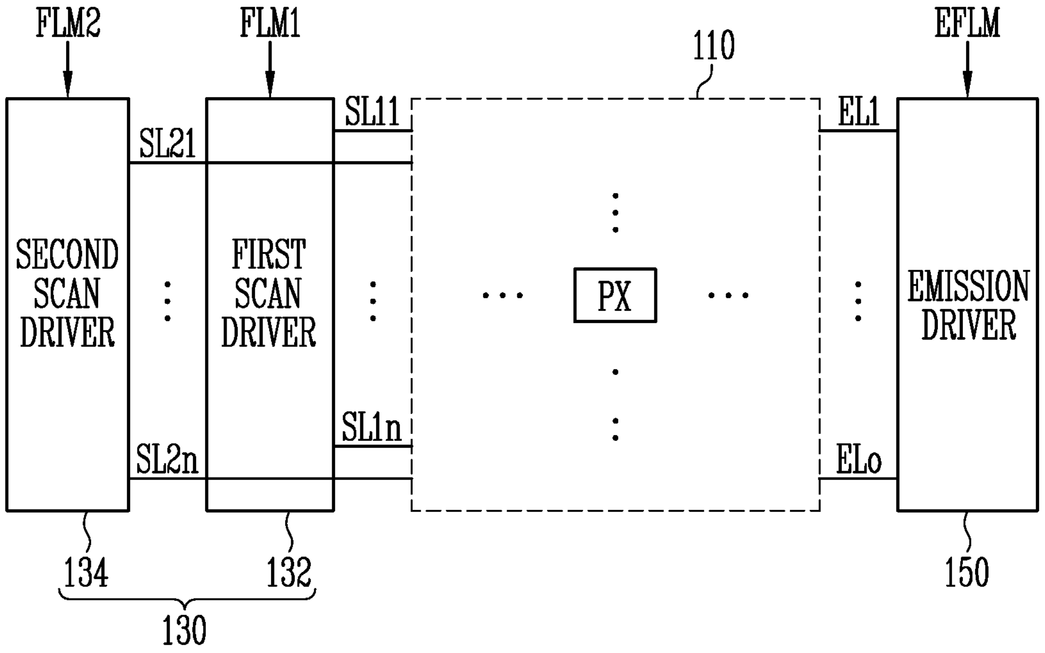
FIG. 3 is a diagram illustrating an embodiment of a scan driver and an emission driver, which are shown in FIG. 2.

FIG. 2 is a diagram illustrating a display device in accordance with an embodiment of the present disclosure. FIG. 3 is a diagram illustrating an embodiment of a scan driver and an emission driver, which are shown in FIG. 2.

Referring to FIG. 2, the display device 100 in accordance with the embodiment of the present disclosure may include a pixel unit 110 (or panel), a timing controller 120, a scan driver 130, a data driver 140, an emission driver 150, and a power supply 160. The above-described components may be implemented as separate integrated circuits, and at least two components among the above-described components may be integrated into on integrated circuit. In addition, the scan driver 130 and/or the emission driver 150 may be formed in the pixel unit 110.

The pixel unit 110 may include pixels PX connected to first scan lines SL11, SL12, . . . , and SL1*n*, second scan lines SL21, SL22, . . . , and SL2*n*, data lines DL1, DL2, . . . , and DLm, emission control lines EL1, EL2, . . . , and ELo, and power lines PL1, PL2, and PL3 (n, m, and o are integers of 0 or more).

In an example, a pixel PXij (see FIG. 4) located on an ith horizontal line (or pixel row) and a jth vertical line (or pixel column) may be connected to an ith first scan line SL1*i*, an ith second scan line SL2*i*, a kth emission control line ELk, and a jth data line DLj (i is an integer of n or less, j is an integer of m or less, and k is an integer of o or less). Here, k is a number which is equal to i or is smaller than i. In an example, when each of the emission control lines EL1 to ELo is connected to pixels PX located on one horizontal line, k may be a number equal to i. In an example, when each of the emission control lines EL1 to ELo is connected to pixels PX located on at least two horizontal lines, k may be a number smaller than i.

Pixels PX connected to one scan line may be selected at the same time. For example, the pixels PX may be sequentially selected in a unit of horizontal line (e.g., pixels PX connected to the same scan line may be selected as one horizontal line (or pixel row) when a first scan signal is supplied to the first scan lines SL11 to SL1*n*. The pixels PX selected by the first scan signal may be supplied with a data signal from a data line (any one of DL1 to DLm) connected thereto. The pixels PX supplied with the data signal may generate light with a predetermined luminance corresponding to a voltage of the data signal.

The scan driver 130 may receive a scan driving signal SCS from the timing controller 120. A scan start signal and clock signals, which are necessary for driving of the scan driver 130, may be included in the scan driving signal SCS. The scan driver 130 may generate first scan signals and second scan signals while shifting the scan start signal corresponding to the clock signal.

To this end, the scan driver 130 may include a first scan driver 132 and a second scan driver 134 as shown in FIG. 3.

The first scan driver 132 may receive a first scan start signal FLM1, and generate the first scan signals while shifting the first scan start signal FLM1 corresponding to the clock signal. The first scan driver 132 may sequentially supply the first scan signals to the first scan lines SL11 to SL1*n*.

The second scan driver 134 may receive a second scan start signal FLM2, and generate second scan signals while shifting the second scan start signal FLM2 corresponding to the clock signal. The second scan driver 134 may sequentially supply the second scan signals to the second scan lines SL21 to SL2*n*. The first scan signals and the second scan signals may be set to a gate-on voltage such that transistors included in the pixels PX can be turned on.

In an example, the first scan signals and the second scan signals which have a low level may be supplied to a P-type transistor, and the first scan signals and the second scan signals which have a high level may be supplied to an N-type transistor. The transistor supplied with the first scan signals or the second scan signals may be turned on corresponding to the first scan signals or the second scan signals. The first scan signals and the second scan signals are supplied may mean that the gate-on voltage is supplied to a first scan line SL1 and a second scan line SL2. Also, the first scan signals and the second scan signals are not supplied may mean that a gate-off voltage is supplied to the first scan line SL1 and the second scan line SL2.

In FIG. 3, it is illustrated that the first scan driver 132 and the second scan driver 134 are respectively connected to the first scan line SL1 and the second scan line SL2. However, the embodiment of the present disclosure is not limited thereto. In an example, the first scan line SL1 and the second scan line SL2 may be driven by one scan driver.

The data driver 140 may receive output data Dout and a data driving signal DCS from the timing controller 120. The data driving signal DCS may include a sampling signal and/or timing signals necessary for driving the data driver 140. The data driver 140 may generate a data signal based on the data driving signal DCS and the output data Dout. In an example, the data driver 140 may generate an analog data signal based on a grayscale of the output data Dout. The data driver 140 may supply a data voltages Vdata to the data lines DL1 to DLm during one horizontal period 1H (see FIG. 5).

The emission driver 150 may receive an emission driving signal ECS from the timing controller 120. An emission start signal EFLM and clock signals which are necessary for driving the emission driver 150 may be included in the emission driving signal ECS. The emission driver 150 may generate emission control signals while shifting the emission start signal EFLM corresponding to the clock signal. The emission driver 150 may sequentially supply the emission control signals to the emission control lines EL1 to ELo. The emission control signal may be set to the gate-off voltage such that the transistors included in the pixels PX can be turned off.

In an example, the emission control signal having the high level may be supplied to the P-type transistor and the emission control signal having the low level may be supplied to the N-type transistor. The transistor receiving the emission control signal may be turned off corresponding to the emission control signal. The emission control signal is supplied may mean that the gate-off voltage is supplied to an emission control line EL. The emission control signal is not supplied may mean that the gate-on voltage is supplied to the emission control line EL.

The timing controller 120 may receive input data Din and a control signal CS from a host system through an interface. In an example, the timing controller 120 may receive the input data Din and the control signal CS from at least one of a Graphics Processing Unit (GPU), a Central Processing Unit (CPU), and an Application Processor (AP), which are included in the host system. Various signals including a clock signal may be included in the control signal.

The timing controller 120 may generate the scan driving signal SCS, the data driving signal DCS, and the emission driving signal ECS based on the control signal CS. The scan driving signal SCS, the data driving signal DCS, and the emission driving signal ECS may be respectively supplied to the scan driver 130, the data driver 140, and the emission driver 150.

The timing controller 120 may realign the input data Din to be suitable for specifications of the display device 100. Also, the timing controller 120 may generate the output data Dout by correcting the input data Din and supply the output data Dout to the data driver 140. In an embodiment, the timing controller 120 may correct the input data Din corresponding to an optical measurement result measured in a processing process.

The power supply 160 may generate various power sources necessary for driving of the display device 100. In an example, the power supply 160 may generate a first driving power source VDD, a second driving power source VSS, and an initialization power source Vint.

The first driving power source VDD may be a power source which supplies a first voltage to the pixels PXs. The second driving power source VSS may be a power source which supplies a second voltage to the pixels PX. The first driving power source VDD may be set to a voltage higher than a voltage of the second driving power source VSS during a period in which the pixels PX is set to be in an emission state.

The initialization power source Vint may be a power source which initializes a first electrode (or anode electrode) of a light emitting element LD (see FIG. 4) included in each of the pixels PX. The initialization power source Vint may have a voltage value at which the light emitting element LD is turned off when a voltage of the initialization power source Vint is supplied to the first electrode of the light emitting element LD.

The first driving power source VDD generated in the power supply 160 may be supplied to a first power line PL1, the second driving power source VSS generated in the power supply 160 may be supplied to a second power line PL2, and the initialization power source Vint generated in the power supply 160 may be supplied to a third power line PL3. The first power line PL1, the second power line PL2, and the third power line PL3 may be connected to the pixels PX, but the embodiment of the present disclosure is not limited thereto.

In an embodiment, the first power line PL1 may include a plurality of power lines, and the plurality of power lines may be connected to different pixels PX. In an embodiment, the second power line PL2 may include a plurality of power lines, and the plurality of power lines may be connected to different pixels PX. In an embodiment, the third power line PL3 may include a plurality of power lines, and the plurality of power lines may be connected to different pixels PX. That is, in an embodiment of the present disclosure, the pixels PX may be connected to any one of the plurality of power lines of the first power line PL1, any one of the plurality of power lines of the second power line PL2, and any one of the plurality of power lines of the third power line PL3.

Figure 4:
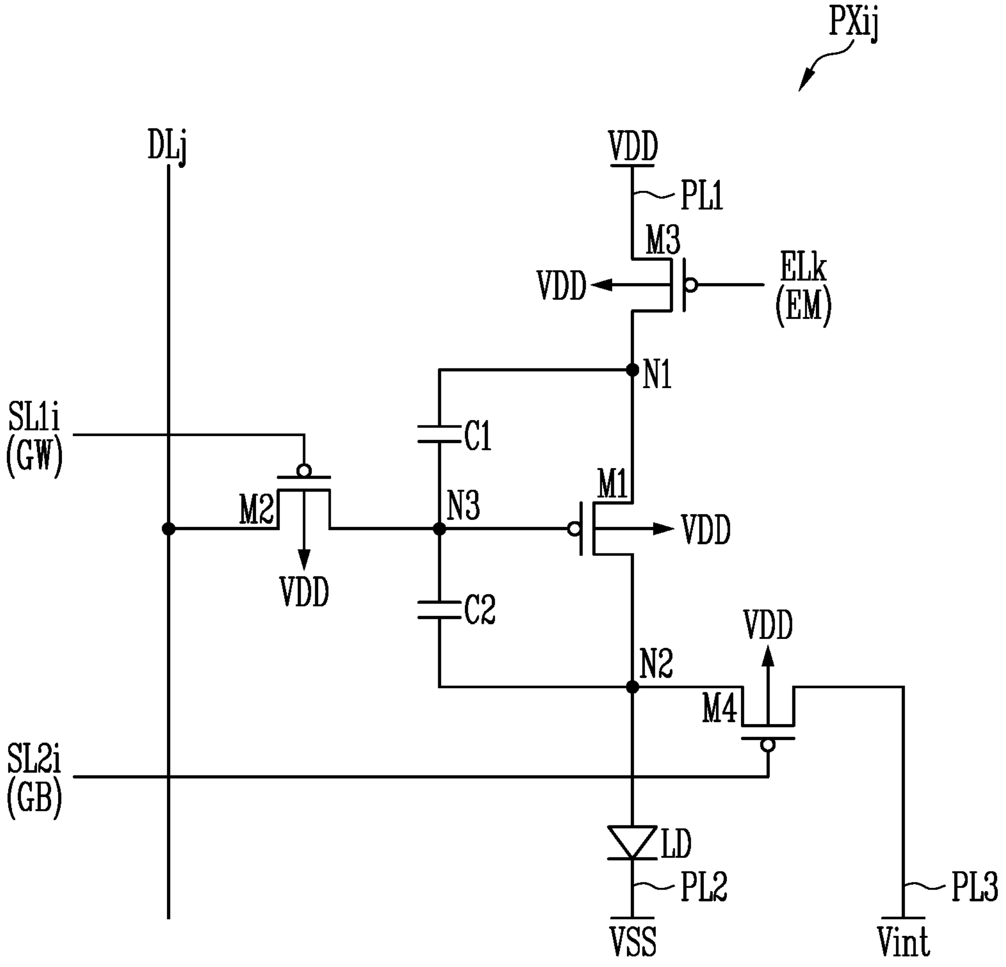
FIG. 4 is a diagram illustrating an embodiment of a pixel shown in FIG. 2.

FIG. 4 is a diagram illustrating an embodiment of the pixel shown in FIG. 2. In FIG. 4, a pixel PXij located on an ith horizontal line and a jth vertical line will be illustrated.

Referring to FIG. 4, the pixel PXij in accordance with the embodiment of the present disclosure may be connected corresponding signal lines SL1*i*, SL2*i*, ELk, and DLj. For example, the pixel PXij may be connected to an ith first scan line SL1*i*, an ith second scan line SL2*i*, a kth emission control line Elk, and a jth data line DLj. In an embodiment, the pixel PXij may be further connected to the first power line PL1, the second power line PL2, and the third power line PL3.

The pixel PXij in accordance with the embodiment of the present disclosure may include a light emitting element LD and a pixel circuit for controlling an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a second node N2, a first transistor M1, a first node N1, and a third transistor M3, and a second electrode (or cathode electrode) of the light emitting element LD may be electrically connected to the second power line PL2. The light emitting element LD may generate light with a predetermined luminance corresponding to an amount of current supplied to the second power line PL2 via the pixel circuit from the first power line PL1.

The light emitting element LD may be an organic light emitting diode. Also, the light emitting element LD may be an inorganic light emitting diode such as a micro LED (light emitting diode) or a quantum dot light emitting diode. Also, the light emitting element LD may be an element configured with a combination of an organic material and an inorganic material. In FIG. 4, it is illustrated that the pixel PXij includes a single light emitting element LD. However, in another embodiment, the pixel PXij may include a plurality of light emitting elements LD, and the plurality of light emitting elements LD may be connected in series, parallel or series/parallel to each other.

The pixel circuit may include the first transistor M1, a second transistor M2, the third transistor M3, a fourth transistor M4, a first capacitor C1, and a second capacitor C2.

Each of the first transistor M1 to fourth transistor M4 may be a MOSFET (Metal-Oxide-Semiconductor Field-Effect Transistor) including a body electrode as disclosed in FIG. 1. The first transistor M1 to fourth transistor M4 can be mounted in a narrow area and, accordingly, the pixel PXij can be applied to a high-resolution panel. The body electrode of each of the first transistor M1 to fourth transistor M4 may be supplied with the first driving power source VDD. In an example, the body electrode of each of the first transistor M1 to fourth transistor M4 may be electrically connected to the first power line PL1.

In an embodiment, each of the first transistor M1 to fourth transistor M4 may be formed as a P-type transistor. However, this is merely illustrative, and at least one of the first transistor M1 to fourth transistor M4 may be replaced with an N-type transistor.

A first electrode of the first transistor M1 may be connected to the first node N1, and a second electrode of the first transistor M1 may be connected to the second node N2. The term "being connected" includes a meaning of "being electrically connected." A gate electrode of the first transistor M1 may be connected to a third node N3. The first node N1 may mean a node to which a second electrode of the third transistor M3 is connected, and the second node N2 may mean a node to which the first electrode of the light emitting element LD is connected. The first transistor M1 may control an amount of current supplied to the second driving power source VSS via the light emitting element LD from the first driving power source VDD.

The second transistor M2 may be connected between the data line DLj and the third node N3. In addition, a gate electrode of the second transistor M2 may be electrically connected to the first scan line SL1*i*. The second transistor M2 may be turned on when a first scan signal GW is supplied to the first scan line SL1*i* to electrically connect the data line DLj and the third node N3 to each other.

A first electrode of the third transistor M3 may be electrically connected to the first power line PL1 and the second electrode of the third transistor M3 may be connected to the first node N1. In addition, a gate electrode of the third transistor M3 may be electrically connected to the emission control line ELk. The third transistor M3 may be turned off when an emission control signal EM is supplied to the emission control line ELk and be turned on when the emission control signal EM is not supplied. When the third transistor M3 is turned off, the first power line PL1 and the first node N1 may be electrically disconnected from each other.

A first electrode of the fourth transistor M4 may be connected to the second node N2 and a second electrode of the fourth transistor M4 may be electrically connected to the third power line PL3. In addition, a gate electrode of the fourth transistor M4 may be electrically connected to the second scan line SL2*i*. The fourth transistor M4 may be turned on when a second scan signal GB is supplied to the second scan line SL2*i* to electrically connect the second node N2 and the third power line PL3 to each other.

The first capacitor C1 may be connected between the first node N1 and the third node N3. The first capacitor C1 may transfer a voltage variation of the first node N1 to the third node N3 while being driven as a coupling capacitor. Also, the first capacitor C1 may store the voltage of the third node N3.

The second capacitor C2 may be connected between the second node N2 and the third node N3. The second capacitor C2 may transfer a voltage variation of the second node N2 while being driven as a coupling capacitor.

Figure 5:
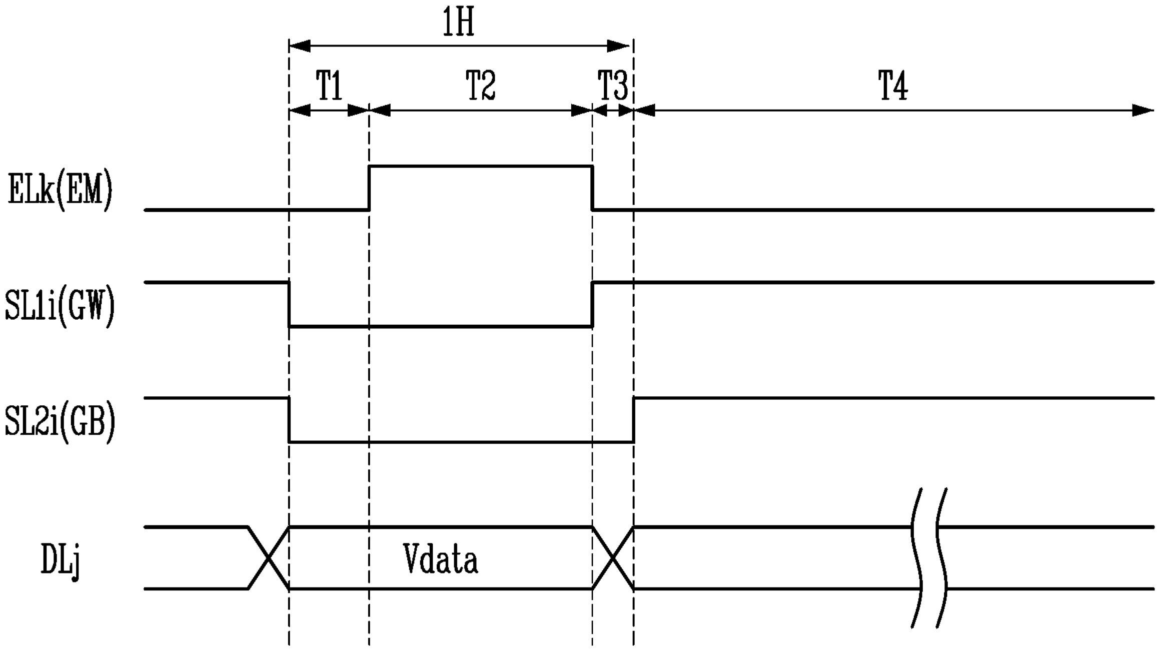
FIG. 5 is a waveform diagram illustrating an embodiment of a driving method of the pixel shown in FIG. 4.

FIG. 5 is a waveform diagram illustrating an embodiment of a driving method of the pixel shown in FIG. 4.

Referring to FIG. 5, a horizontal period 1H (or specific horizontal period) in which a data signal is supplied to the pixel PXij located on the ith horizontal line and the jth vertical line may include a first period T1, a second period T2, and a third period T3.

The data driver 140 may supply a data voltage Vdata of the data signal to the data line DLj during the first period T1, the second period T2, and the third period T3.

The scan driver 130 (or the first scan driver 132) may supply the first scan signal GW to the first scan line SL1*i* during the first period T1 and the second period T2.

The scan driver 130 (or the second scan driver 134) may supply the second scan signal GB to the second scan line SL2*i* during the first period T1 to the third period T3.

The emission driver 150 may supply the emission control signal EM to the emission control line ELk during the second period T2.

The first period T1 is a period in which the voltage of the first driving power source VDD is supplied to the first node N1, the voltage of the initialization power source Vint is supplied to the second node N2, and the data voltage Vdata of the data signal is supplied to the third node N3. During the first period T1, the light emitting element LD may be initialized. During the first period T1, the first capacitor C1 and the second capacitor C2 may store the data voltage Vdata of the data signal, which is supplied to the third node N3 while being initialized. The first period T1 may be referred to as an initialization period and a data signal writing period.

The second period T2 is a period in which the voltage of the initialization power source Vint is supplied to the second node N2 and the data voltage Vdata of the data signal is supplied to the third node N3. During the second period T2, a voltage corresponding to a threshold voltage of the first transistor T1 may be stored in the first capacitor C1. The second period T2 may be referred to as a threshold voltage compensation period.

During the third period T3, the first transistor M1 controls an amount of current supplied to the initialization power source Vint from the first driving power source VDD. An unnecessary current can be prevented from being supplied to the light emitting element LD after the second period T2. The third period T3 may be referred to as a luminance control period.

During a fourth period T4, the first transistor M1 controls an amount of current flowing from the first driving power source VDD to the second driving power source VSS via the light emitting element LD corresponding to the voltage of the third node N3. During the fourth period T4, the light emitting element LD may emit light with a luminance corresponding to an amount of current supplied from the first transistor M1. The fourth period T4 may be referred to as an emission period.

FIGS. 6A to 6D are diagrams illustrating an embodiment of an operation process of a pixel corresponding to a driving waveform shown in FIG. 5.

Figure 6A:
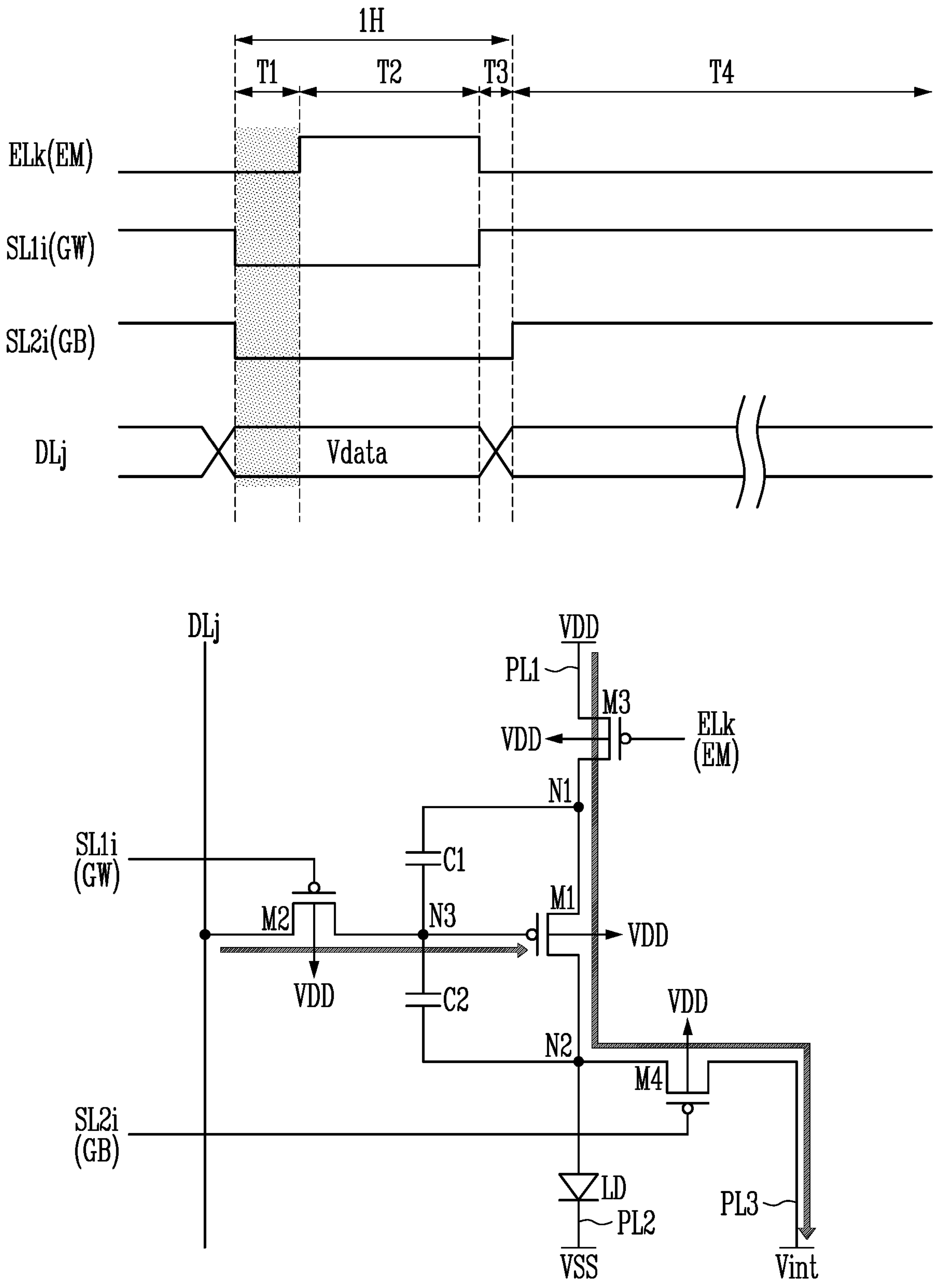
FIGS. 6A, 6B, 6C and 6D are diagrams illustrating an embodiment of an operation process of a pixel corresponding to a driving waveform shown in FIG. 5.

Referring to FIG. 6A, during the first period T1, the first scan signal GW is supplied to the first scan line SL1*i*, and the second scan signal GB is supplied to the second scan line SL2*i*. Also, during the first period T1, the emission control signal EM is not supplied to the emission control line ELk, and accordingly, the third transistor M3 is set to be in a turn-on state. When the third transistor M3 is turned on, the voltage of the first driving power source VDD is supplied to the first node N1.

When the first scan signal GW is supplied to the first scan line SL1*i*, the second transistor M2 is turned on. When the second transistor M2 is turned on, the data voltage Vdata of the data signal from the data line DLj is supplied to the third node N3. The first capacitor C1 may be initialized by the data voltage Vdata of the data signal and the voltage of the first driving power source VDD. In an example, during the first period T1, the first capacitor C1 may charge a voltage difference between the data voltage Vdata of the data signal and the voltage of the first driving power source VDD regardless of a voltage charged in a previous period (or previous frame period).

When the second scan signal GB is supplied to the second scan line SL2*i*, the fourth transistor M4 is turned on. When the fourth transistor M4 is turned on, the voltage of the initialization power source Vint is supplied to the second node N2. When the voltage of the initialization power source Vint is supplied to the second node N2, the light emitting element LD may be initialized. In an example, when the voltage of the initialization power source Vint is supplied, a parasitic capacitor (not shown) of the light emitting element LD may be discharged. The voltage of the initialization power source Vint may be set to a voltage at which the light emitting element LD is turned off (or emits no light), and accordingly, the light emitting element LD may be set to be in a non-emission state.

The second capacitor C2 may be initialized by the data voltage Vdata of the data signal which is supplied to the third node N3 and the voltage of the initialization power source Vint which is supplied to the second node N2. In an example, during the first period T1, the second capacitor C2 may charge a voltage difference between the data voltage Vdata of the data signal and the voltage of the initialization power source Vint regardless of a voltage charged in a previous period (or previous frame period).

During the first period T1, the current supplied from the first transistor M1 corresponding to the voltage of the third node N3 may be discharge to the initialization power source Vint via the fourth transistor M4. Therefore, during the first period T1, the light emitting element LD may maintain the non-emission state.

Figure 6B:
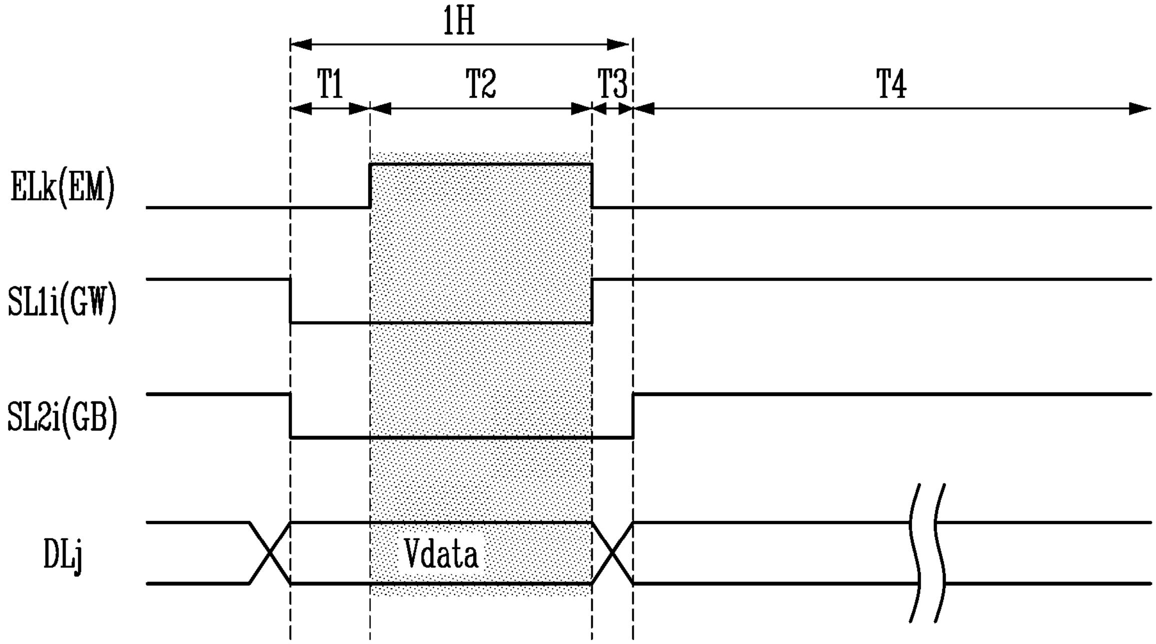
Figure 6B:
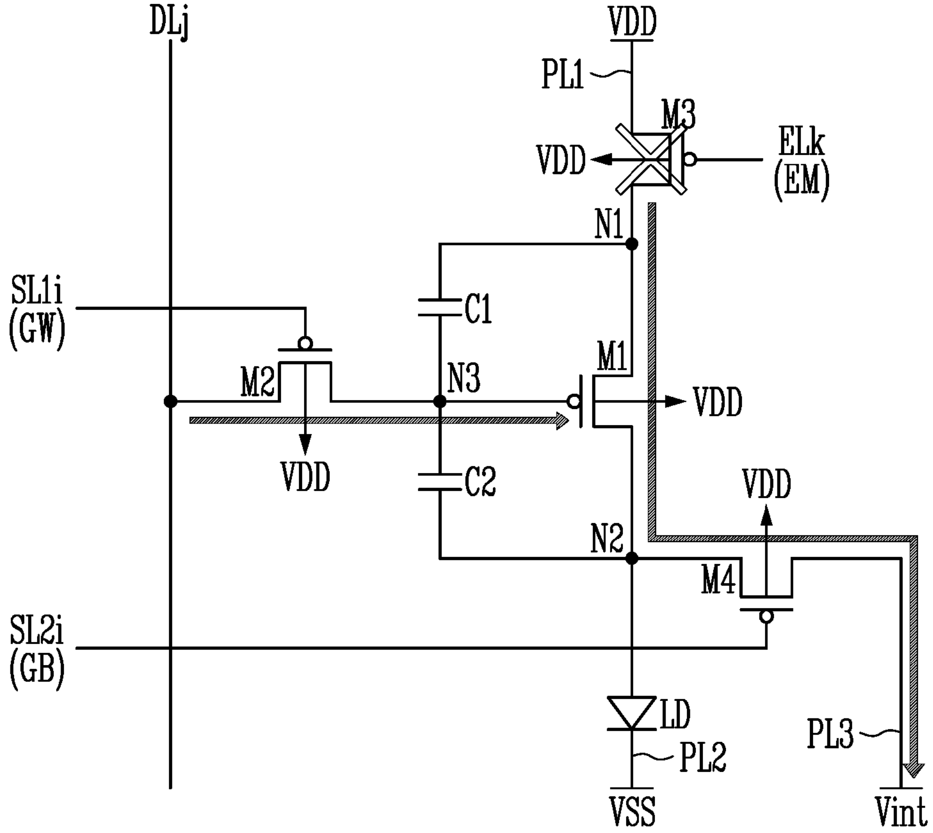

Referring to FIG. 6B, during the second period T2, the turn-on state of the second transistor M2 may be maintained by the first scan signal GW supplied to the first scan line SL1*i*, and the turn-on state of the fourth transistor M4 may be maintained by the second scan signal GB supplied to the second scan line SL2.

Also, during the second period T2, the third transistor M3 may be turned off by the emission control signal EM supplied to the emission control line ELk. When the third transistor M3 is turned off, the first power line PL1 and the first node N1 is disconnected.

Since the second transistor T2 is set to be in the turn-on state during the second period T2, the data voltage Vdata of the data signal from the data line DLj is supplied to the third node N3. A voltage of the first node N1 may be decreased from the voltage of the first driving power source VDD to a voltage obtained by adding an absolute threshold voltage of the first transistor M1 to the data voltage Vdata of the data signal (Vdata+|Vth(M1)|).

That is, during the second period T2, the third node N3 may be set to the data voltage Vdata of the data signal, and the first node N1 may be set to the voltage (Vdata+|Vth(M1)|) obtained by adding the absolute threshold voltage of the first transistor M1 to the data voltage Vdata of the data signal. Therefore, during the second period T2, the threshold voltage of the first transistor T1 may be stored in the first capacitor C1.

Since the fourth transistor M4 is set to be in the turn-on state during the second period T2, a current from the first node N1 to the second node N2 via the first transistor M1 may be discharged to the initialization power source Vint via the fourth transistor M4. Therefore, during the second period T2, the light emitting element LD may maintain the non-emission state.

Figure 6C:
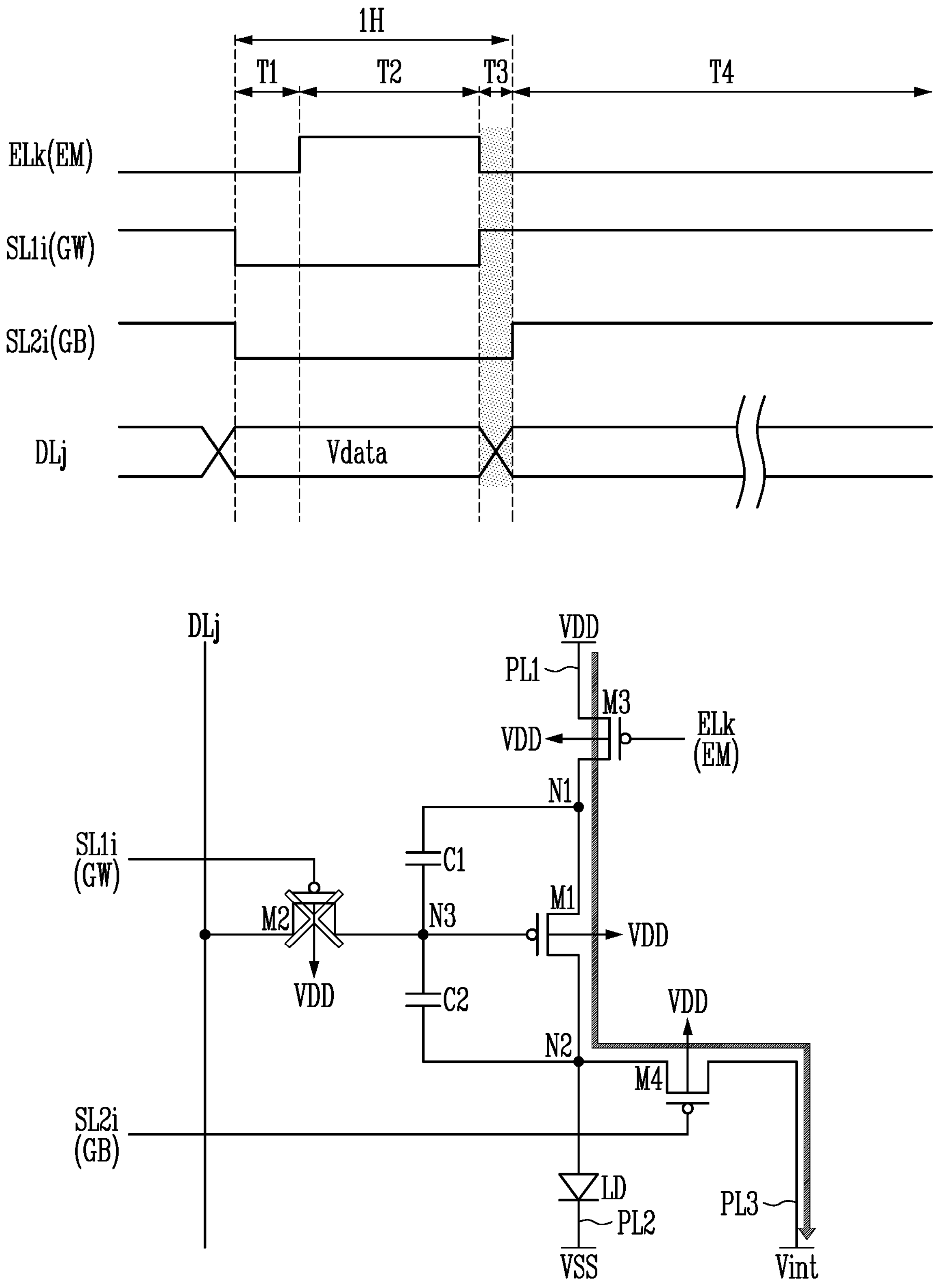

Referring to FIG. 6C, during the third period T3, the supply of the emission control signal EM to the emission control line ELk is suspended, and accordingly, the third transistor M3 may be set to be in the turn-on state. Also, during the third period T3, the supply of the first scan signal GW to the first scan line SL1*i* is suspended, and accordingly, the second transistor M2 may be set to be in a turn-off state. During the third period T3, the supply of the second scan signal GB to the second scan line SL2*i* is maintained, and accordingly, the turn-on state of the fourth transistor M4 is maintained.

Since the third transistor M3 is set to be in the turn-on state during the third period T3, the first transistor M1 controls an amount of current supplied to the second node N2 from the first driving power source VDD corresponding to the voltage applied to the third node N3. Since the fourth transistor M4 is set to be in the turn-on state, the current supplied to the second node N2 may be discharged to the initialization power source Vint. That is, during the third period T3, the light emitting element LD is set to be in the non-emission state, and accordingly, the grayscale expression ability of the display device 100 can be improved.

This will be described in detail. A voltage of the second node N2 may be increased to a voltage higher than a desired voltage through the second period T2, and accordingly, an unnecessary current may be supplied to the light emitting element LD. In an example, the light emitting element LD may temporarily emit light even when a black grayscale is implemented in the pixel PXij. Thus, in the embodiment of the present disclosure, the current supplied from the first transistor M1 is discharge to the initialization power source Vint during the third period T3, and accordingly, the grayscale expression ability of the display device 100 can be improved.

Additionally, when a grayscale can be stably implemented in the display device 100, the third period T3 may be omitted.

Figure 6D:
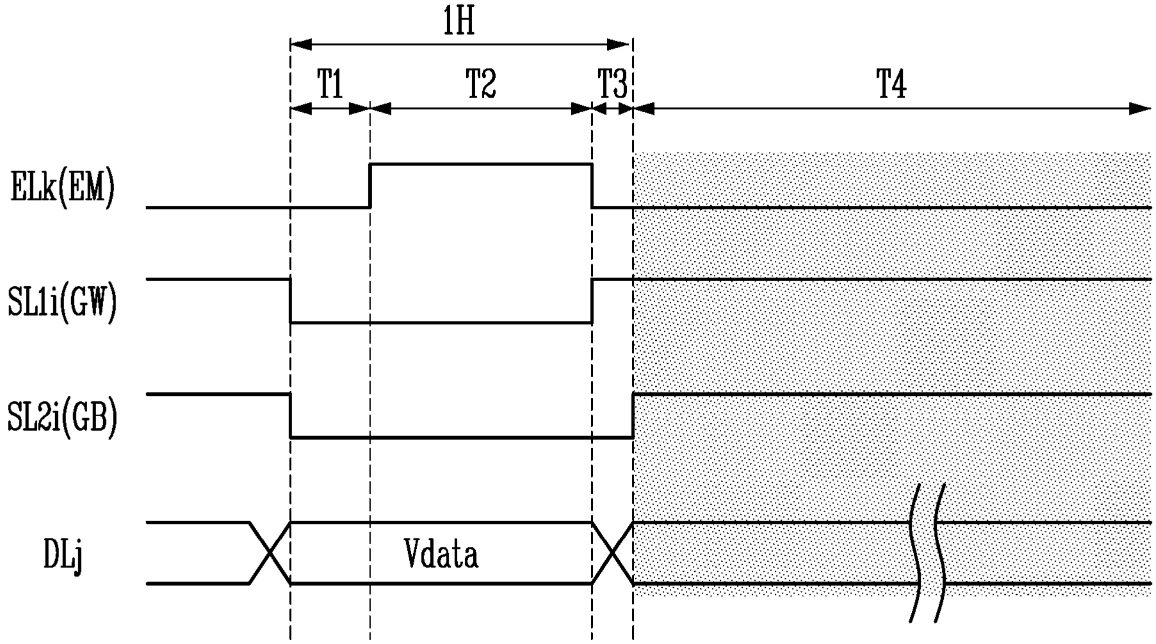
Figure 6D:
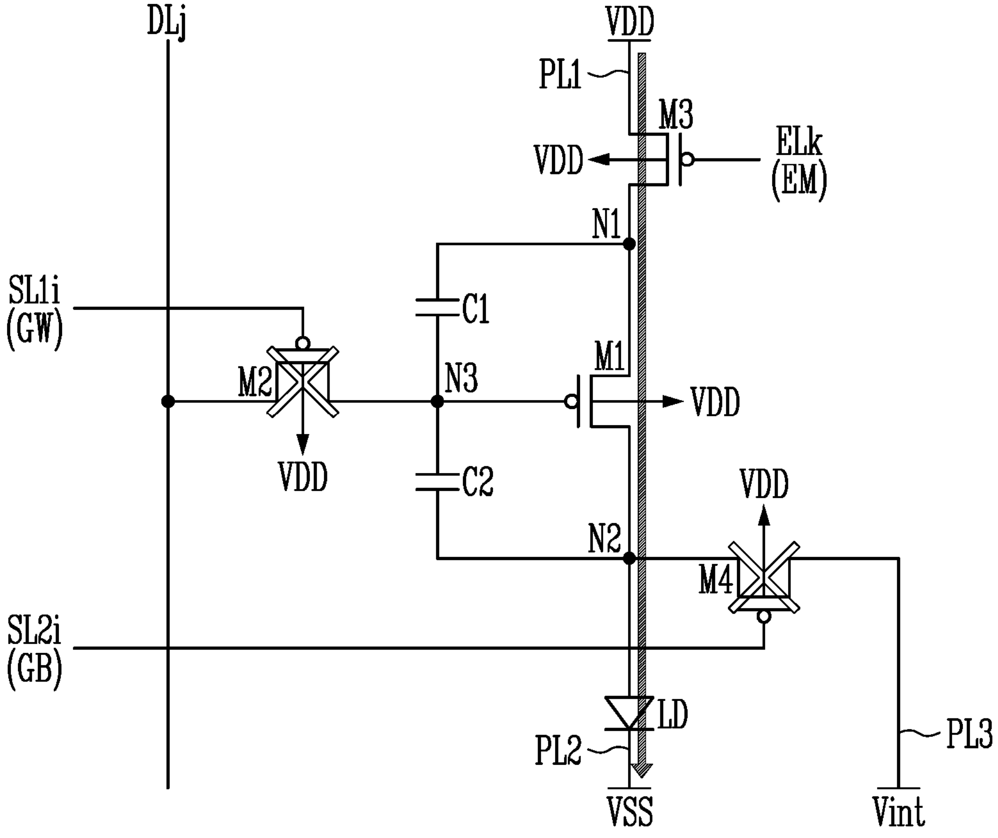

Referring to FIG. 6D, the supply of the second scan signal GB to the second scan line SL2*i* is suspended during the fourth period T4 and, accordingly, the fourth transistor M4 may be turned off. The first scan signal GW is not supplied to the first scan line SL1*i* during the fourth period T4 and, accordingly, the second transistor M2 maintains the turn-off state. The emission control signal EM is not supplied to the emission control line ELk during the fourth period T4 and, accordingly, the third transistor M3 maintains the turn-on state.

The first transistor M1 controls the amount of current supplied from the first driving power source VDD to the second driving power source VSS via the light emitting element LD. During the fourth period T4, the light emitting element LD may generate light with a luminance corresponding to an amount of driving current supplied from the first transistor M1.

In the embodiment of the present disclosure, a threshold voltage compensation process will be described in detail. First, during the second period T2, the third node N3 is set to the data voltage Vdata of the data signal, and the first node N1 is set to the voltage obtained by adding the absolute threshold voltage of the first transistor M1 to the data voltage Vdata of the data signal (Vdata+|Vth(M1)|). Then, the threshold voltage of the first transistor M1 may be stored in the first capacitor C1. That is, during the second period T2, the threshold voltage of the first transistor M1 may be primarily compensated.

When assuming that the voltage of the first driving power source VDD is set to 8V during the second period T2, the body electrode of the first transistor M1 may be set to 8V, and a source electrode (i.e., the first node N1) may be set to a voltage lower than the voltage of the body electrode. In an example, when assuming that the first node N1 is set to 4V, a voltage difference (e.g., VBS=4V) between the body electrode and the source electrode of the first transistor M1 may be set to 4V. The first transistor M1 may have a first threshold voltage. In the second period T2, the first threshold voltage may be compensated.

Meanwhile, during the fourth period T4, the first node N1 is set to the voltage of the first driving power source VDD. The body electrode and the source electrode of the first transistor M1 may be set to the same voltage (i.e., VBS=0), and the first transistor M1 may have a second threshold voltage different from the first threshold voltage.

When the voltage of the first driving power source VDD is supplied to the first node N1 during the fourth period T4, the voltage of the third node N3 may be set as shown in Equation 1. Actually, a process in which the voltage of the third node N3 is changed as shown in Equation 1 may be performed in the third period T3. However, for convenience of description, a case where the voltage of the third node N3 is changed during the fourth period T4 will be described. In an example, the third period T3 is a period which may be omitted, and the voltage of the third node N3 will be described using the fourth period T4.

$$VN3a = Vdata + (VDD - (Vdata + |Vth(M1)|)) \times C2/(C1+C2) \qquad \text{Equation 1}$$

In Equation 1, VN3a may denote a voltage of the third node N3 which corresponds to the voltage variation of the first node N1. Referring to Equation 1, during the fourth period T4, the voltage of the first node N1 may be changed from the voltage (Vdata+|Vth(M1)|) obtained by adding the absolute threshold voltage of the first transistor M1 to the data voltage Vdata of the data signal to the voltage of the first driving power source VDD. The voltage of the third node N3 may also be changed due to coupling of the first capacitor C1.

A voltage variation of the third node N3 may be determined corresponding to a ratio of the first capacitor C1 and the second capacitor C2. In an example, the voltage of the third node N3 may be changed by a value obtained by multiplying the voltage variation of the first node N1 by C1/(C1+C2) from the data voltage Vdata of the data signal. When the voltage variation of the third node N3 is controlled by the ratio of the first capacitor C1 and the second capacitor C2, the data signal can have a sufficiently wide voltage range.

Meanwhile, after the voltage of the third node N3 is set as shown in Equation 1, the voltage of the second node N2 may be changed corresponding to the amount of current supplied to the second node N2 from the first transistor M1 corresponding to the voltage of the third node N3. In addition, the voltage of the third node N3 may be changed corresponding to the voltage variation of the second node N2 as shown in Equation 2.

$$VN3b = VN3a + \Delta VN2 \times C2/(C1+C2) \qquad \text{Equation 2}$$

In Equation 2, ΔVN2 may denote a voltage variation of the second node N2, and VN3b may denote a voltage of the third node N3 which corresponds to the voltage variation ΔVN2 of the second node N2. Referring to FIG. 2, during the fourth period T4, the voltage of the third node N3 may be changed by a value obtained by multiplying the voltage variation ΔVN2 of the second node N2 by C2/(C1+C2).

The voltage variation ΔVN2 of the second node N2 may be differently set corresponding to the second threshold voltage. That is, the voltage variation ΔVN2 of the second node N2 is differently set corresponding to the second threshold voltage and is reflected on the third node N3, so that the second threshold voltage of the first transistor M1 can be compensated.

Meanwhile, the voltage variation ΔVN2 of the second node N2 of each pixel PX may be differently set by the second threshold voltage of the first transistor M1. The voltage variation ΔVN2 of the second node N2 is reflected on the third node N3, so that a threshold voltage deviation of the first transistor M1 included in each pixel PX can be compensated.

Figure 7:
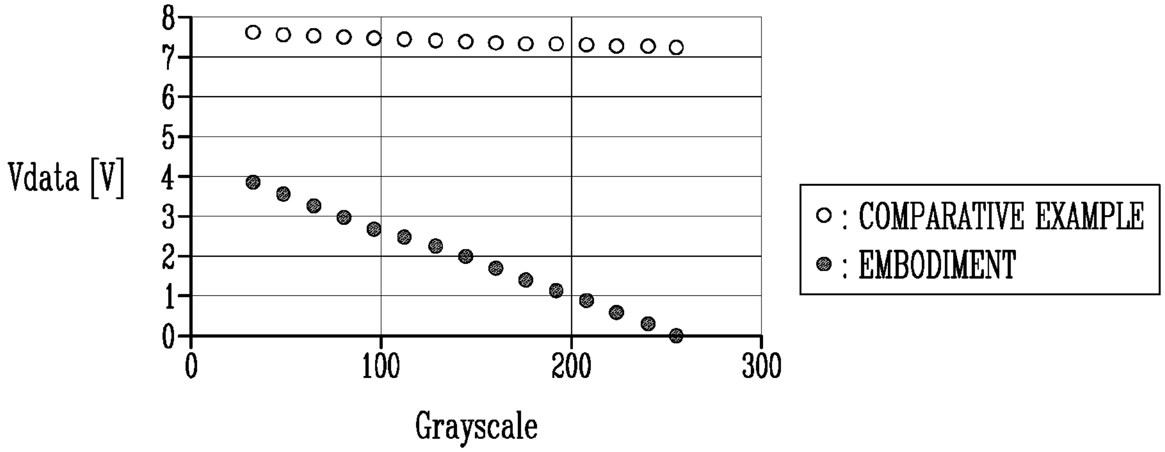
FIG. 7 is a graph illustrating voltage ranges of a data signal, corresponding to an embodiment of the present disclosure and a comparative example.

FIG. 7 is a graph illustrating voltage ranges of a data signal corresponding to an embodiment of the present disclosure and a comparative example. In FIG. 7, the embodiment of the present disclosure may mean the pixel PXij shown in FIG. 4. In FIG. 7, the comparative example includes a MOSFET transistor, and may mean a pixel in which the second capacitor C2 and the fourth transistor M4 are removed in the pixel PXij shown in FIG. 4. In the graph shown in FIG. 7, an X axis may represent grayscale, and a Y axis may represent voltage of the data signal.

Referring to FIG. 7, in the comparative example, the data driver 140 may implement grayscales 32 to 255 by using a voltage range of approximately 0.377V. On the other hand, in the embodiment of the present disclosure, the data driver 140 may implement the grayscales 32 to 255 by using a voltage range of approximately 3.8V. In the embodiment of the present disclosure, the data signal is supplied to the third node N3 included in the pixel PXij, and then the voltage of the third node N3 is changed corresponding to the ratio of the first capacitor C1 and the second capacitor C2, so that the voltage range of the data signal can be widely set. The grayscale expression ability of the display device 100 can be improved.

Figure 8:
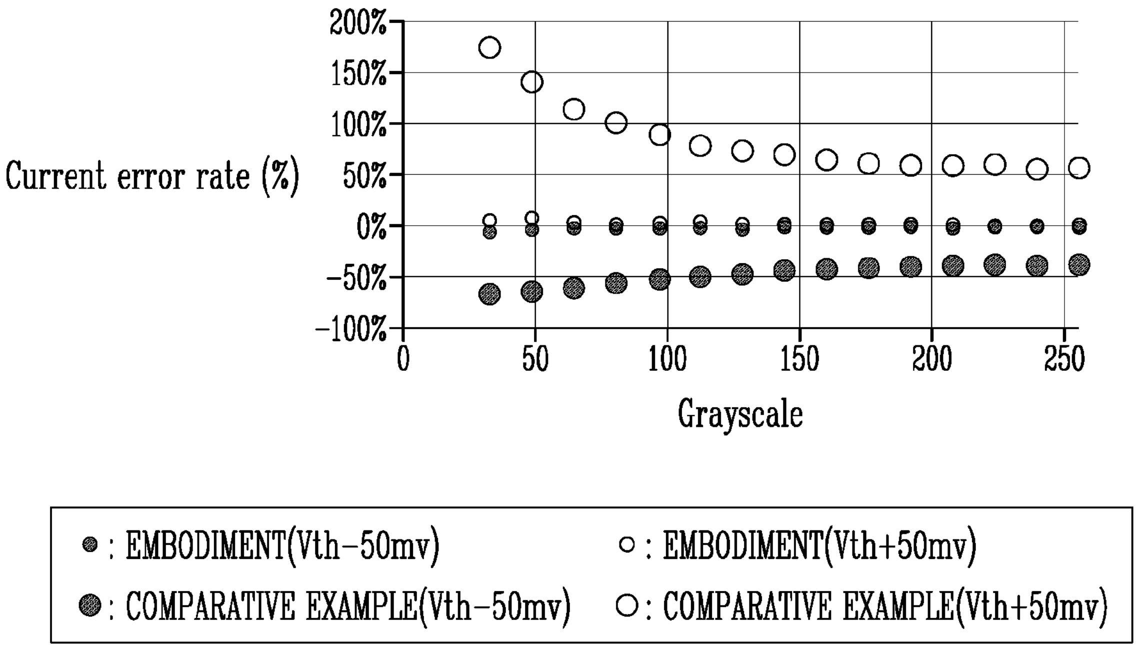
FIG. 8 is a diagram illustrating current error rates corresponding to an embodiment of the present disclosure and a comparative example.

FIG. 8 is a diagram illustrating current error rates corresponding to an embodiment of the present disclosure and a comparative example. In FIG. 8, the embodiment of the present disclosure may mean the pixel PXij shown in FIG. 4, and the comparative example may mean a pixel in which the second capacitor C2 and the fourth transistor M4 are removed in the pixel PXij shown in FIG. 4. In FIG. 8, an X axis may represent grayscale, and a Y axis may represent current error rate (%). The current error rate represents a variation of driving current corresponding to a threshold voltage change of the first transistor M1 using percent (%). FIG. 8 may represent a current error rate when the threshold voltage of the first transistor M1 is changed to ±50 mV.

Referring to FIG. 8, in the comparative example, when the threshold voltage of the first transistor M1 is changed to 50 mV, the current error rate may be approximately 175.9% or less. When the threshold voltage of the first transistor M1 is changed to −50 mV, the current error rate may be approximately −67% or less.

In the embodiment of the present disclosure, when the threshold voltage of the first transistor M1 included in the pixel PXij is changed to 50 mV, the current error rate may be approximately 5.10% or less. When the threshold voltage of the first transistor M1 included in the pixel PXij is changed to −50 mV, the current error rate may be approximately −5.20% or less. That is, in the embodiment of the present disclosure, the current error rate corresponding to the threshold voltage change may be approximately −5.20% to 5.10%. Accordingly, it can be seen that the threshold voltage of the first transistor M1 is stably compensated. That is, in the embodiment of the present disclosure, because the pixel PXij includes a driving transistor (i.e., the first transistor M1) having a body electrode, the threshold voltage can be stably compensated, and accordingly, the pixel PXij can be applied to a high-resolution panel.

Figure 9:
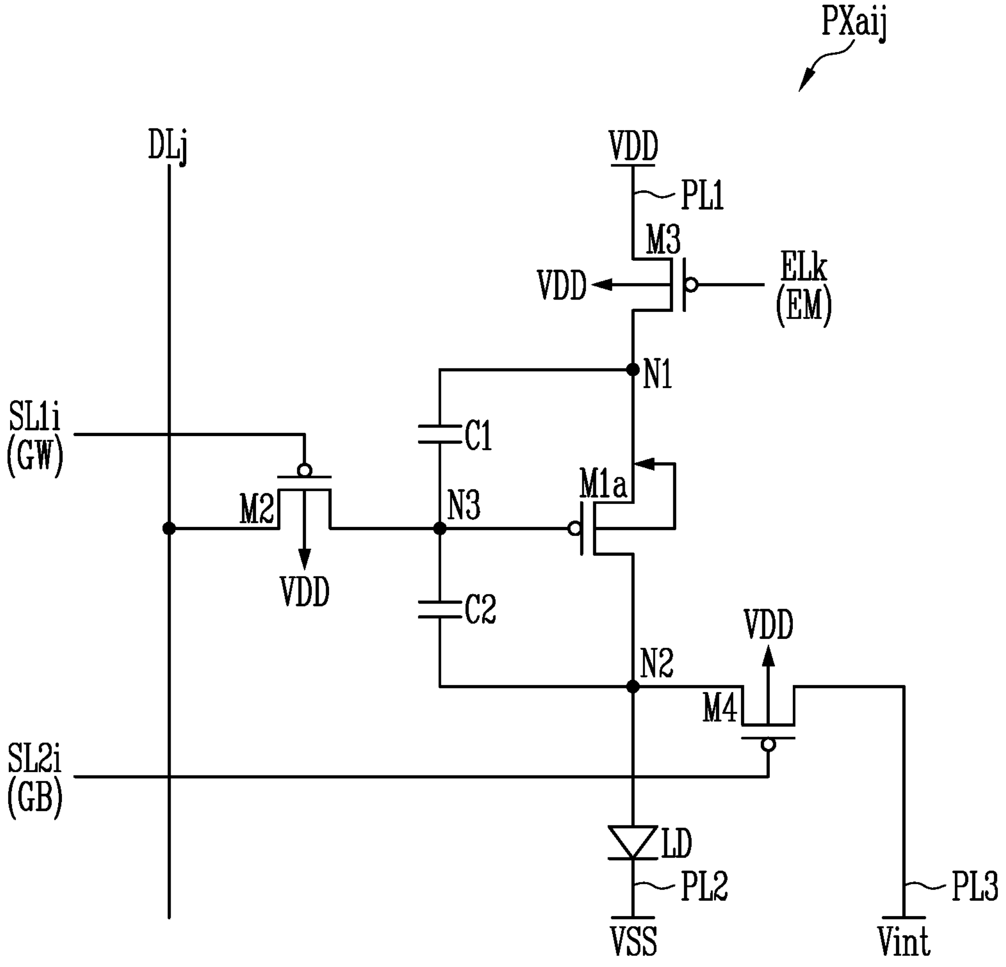
FIG. 9 is a diagram illustrating a pixel in accordance with an embodiment of the present disclosure.

FIG. 9 is a diagram illustrating a pixel in accordance with an embodiment of the present disclosure. In FIG. 9, descriptions of components identical to those shown in FIG. 4 will be omitted.

Referring to FIG. 9, the pixel PXaij in accordance with the embodiment of the present disclosure may be connected corresponding signal lines SL1*i*, SL2*i*, ELk, and DLj. For example, the pixel PXaij may be connected to an ith first scan line SL1*i*, an ith second scan line SL2*i*, a kth emission control line Elk, and a jth data line DLj. In an embodiment, the pixel PXaij may be further connected to the first power line PL1, the second power line PL2, and the third power line PL3.

The pixel PXaij in accordance with the embodiment of the present disclosure may include a light emitting element LD and a pixel circuit for controlling an amount of current supplied to the light emitting element LD.

The light emitting element LD may be connected between the first power line PL1 and the second power line PL2. The light emitting element LD may generate light with a predetermined luminance corresponding to an amount of current supplied to the second power line PL2 via the pixel circuit from the first power line PL1.

The pixel circuit may include the first transistor M1*a*, a second transistor M2, the third transistor M3, a fourth transistor M4, a first capacitor C1, and a second capacitor C2.

A first electrode of the first transistor M1*a* may be connected to the first node N1, and a second electrode of the first transistor M1*a* may be connected to the second node N2. A gate electrode of the first transistor M1*a* may be connected to the third node N3. The first transistor M1*a* may control an amount of current supplied to the second driving power source VSS via the light emitting element LD from the first driving power source VDD.

A body electrode of the first transistor M1*a* may be connected to the first node N1 (i.e., a source electrode of the first transistor M1*a*). When the body electrode of the first transistor M1*a* is connected to the first node N1, the body electrode and the first electrode (i.e., the source electrode) may have the same voltage. A threshold voltage of the first transistor M1*a* is constantly maintained. Accordingly, the threshold voltage of the first transistor M1*a* can be stably compensated.

A driving method of the pixel PXaij shown in FIG. 9 is substantially identical to the driving method of the pixel PXij shown in FIG. 4, and therefore, detailed descriptions will be omitted.

Figure 10:
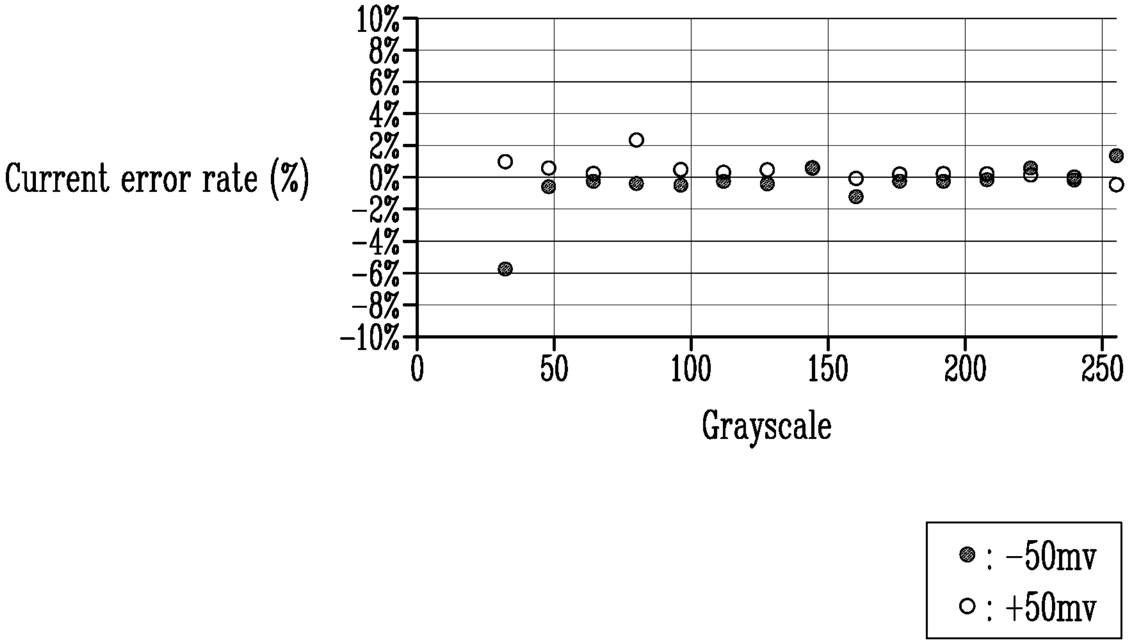
FIG. 10 is a diagram illustrating a current error rate of the pixel shown in FIG. 9.

FIG. 10 is a diagram illustrating a current error rate of the pixel shown in FIG. 9. In FIG. 10, an X axis may represent grayscale, and a Y axis may represent current error rate (%). FIG. 10 may represent a current error rate when the threshold voltage of the first transistor M1*a* is changed to ±50 mV.

Referring to FIG. 10, when the threshold voltage of the first transistor M1*a* included in the pixel PXaij is changed to 50 mV, the current error rate may be approximately 3.3% or less. When the threshold voltage of the first transistor M1*a* included in the pixel PXaij is changed to −50 mV, the current error rate may be approximately −6% or less. That is, in the embodiment of the present disclosure, the current error rate corresponding to the threshold voltage change may be approximately −6% to 3.3%, and accordingly, it can be seen that the threshold voltage of the first transistor M1*a* is stably compensated. That is, in the embodiment of the present disclosure, because the pixel PXaij includes a driving transistor (i.e., the first transistor M1*a*) having a body electrode, the threshold voltage is stably compensated, and accordingly, the pixel PXaij can be applied to a high-resolution panel.

Figure 11:
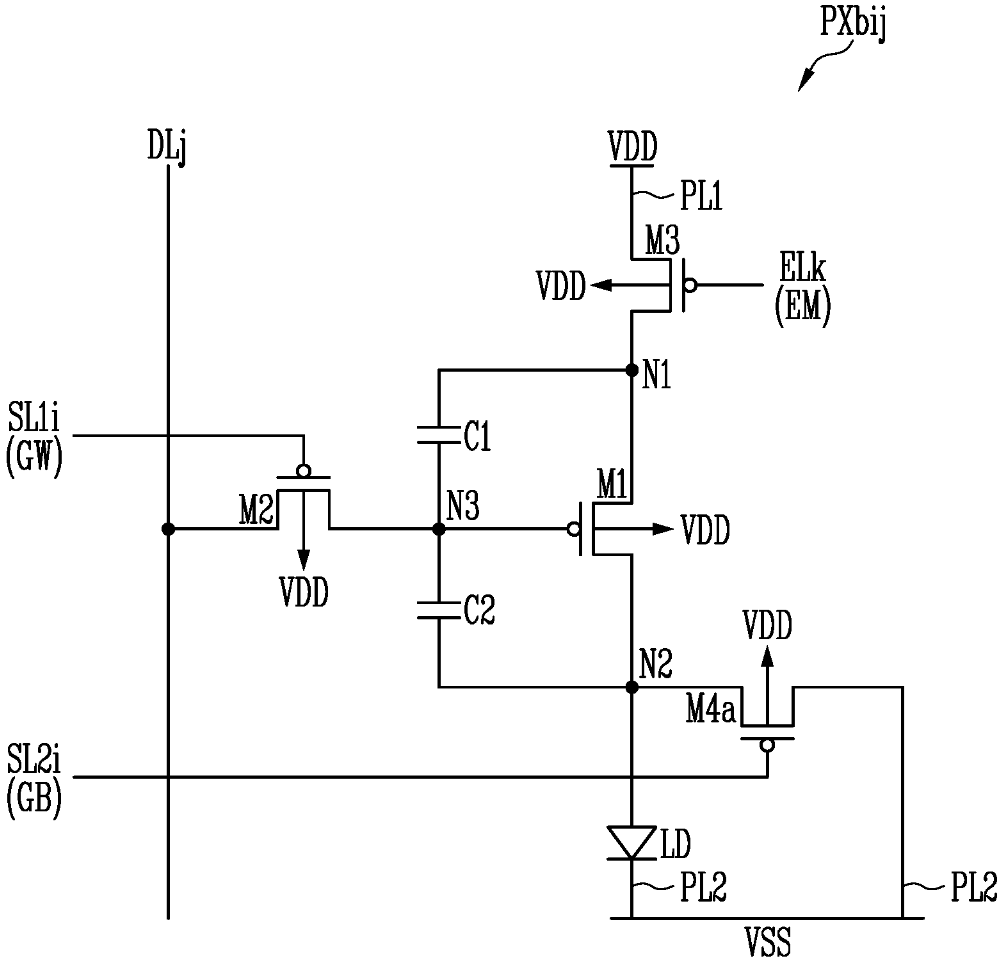
FIG. 11 is a diagram illustrating a pixel in accordance with an embodiment of the present disclosure.

FIG. 11 is a diagram illustrating a pixel in accordance with an embodiment of the present disclosure. In FIG. 11, descriptions of components identical to those shown in FIG. 4 will be omitted.

Referring to FIG. 11, the pixel PXbij in accordance with the embodiment of the present disclosure may be connected corresponding signal lines SL1*i*, SL2*i*, ELk, and DLj. For example, the pixel PXaij may be connected to an ith first scan line SL1*i*, an ith second scan line SL2*i*, a kth emission control line Elk, and a jth data line DLj. In an embodiment, the pixel PXaij may be further connected to the first power line PL1 and the second power line PL2.

The pixel PXbij in accordance with the embodiment of the present disclosure may include a light emitting element LD and a pixel circuit for controlling an amount of current supplied to the light emitting element LD.

The light emitting element LD may be connected between the first power line PL1 and the second power line PL2. The light emitting element LD may generate light with a predetermined luminance corresponding to an amount of current supplied to the second power line PL2 via the pixel circuit from the first power line PL1.

The pixel circuit may include the first transistor M1, a second transistor M2, the third transistor M3, a fourth transistor M4*a*, a first capacitor C1, and a second capacitor C2.

A first electrode of the fourth transistor M4*a* may be connected to the second node N2, and a second electrode of the fourth transistor M4*a* may be electrically connected to the second power line PL2. In addition, a gate electrode of the fourth transistor M4*a* may be electrically connected to the second scan line SL2*i*. The fourth transistor M4*a* may be turned on when the second scan signal GB is supplied to the second scan line SL2*i* to electrically connect the second node N2 and the second power line PL2 to each other.

That is, when the fourth transistor M4*a* is turned on, the second node N2 may be supplied with the second driving power source VSS and, accordingly, the light emitting element LD may be set to be in the non-emission state.

In the pixel PXbij shown in FIG. 11, the third power line PL3 in the pixel PXij shown in FIG. 4 is set as the second power line PL2 and, accordingly, the initialization power source Vint may not be supplied (or the initialization power source Vint may be set as the same power source as the second driving power source VSS). In the pixel PXbij shown in FIG. 11, one power line (i.e., PL3) may be removed as compared with the pixel PXij shown in FIG. 4. A driving method of the pixel PXbij shown in FIG. 11 is substantially identical to the driving method of the pixel PXij shown in FIG. 4, and therefore, detailed descriptions will be omitted.

Figure 12:
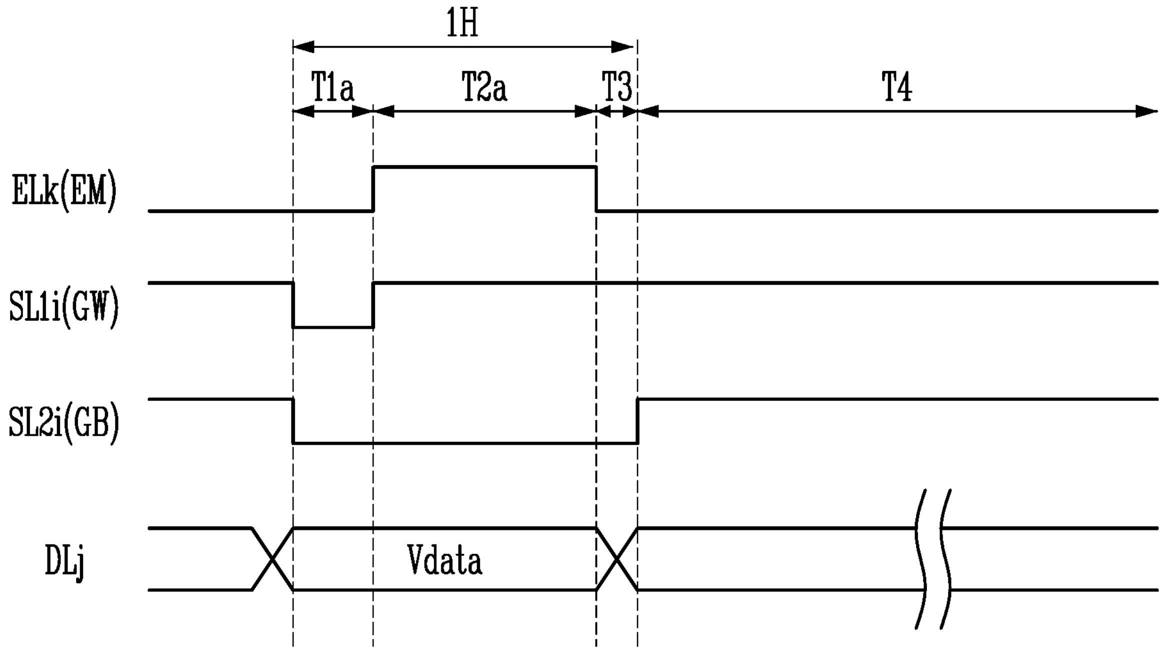
FIG. 12 is a waveform diagram illustrating an embodiment of a driving method of the pixels shown in FIGS. 4, 9, and 11.

FIG. 12 is a waveform diagram illustrating an embodiment of a driving method of the pixels shown in FIGS. 4, 9, and 11. In FIG. 12, an operation process will be described in conjunction with the pixel PXij shown in FIG. 4. In FIG. 12, portions overlapping with those shown in FIG. 5 will be omitted.

Referring to FIG. 12, a horizontal period 1H (or specific horizontal period) in which a data signal is supplied to a pixel PXij located on an ith horizontal line and a jth vertical line may include a first period T1*a*, a second period T2*a*, and a third period T3.

The scan driver 130 (or the first scan driver 132) may supply the first scan signal GW to the first scan line SL1*i* during the first period T1*a*. In the driving waveform shown in FIG. 5, the first scan signal GW is supplied to the first scan line SL1*i* during the first period T1 and the second period T2. On the other hand, in the driving waveform shown in FIG. 12, the first scan signal GW is supplied to the first scan line SL1*i* during the first period T1*a*. Therefore, the driving waveform shown in FIG. 5 and the driving waveform shown in FIG. 12 are different from each other.

The operation process will be described in conjunction with FIGS. 4 and 12. During the first period T1*a*, the first scan signal GW is supplied to the first scan line SL1*i*, and the second scan signal GB is supplied to the second scan line SL2*i*. Also, during the first period T1*a*, the emission control signal EM is not supplied to the emission control line ELk, and accordingly, the third transistor M3 is set to be in the turn-on state. When the third transistor M3 is turned on, the voltage of the first driving power source VDD is supplied to the first node N1.

When the first scan signal GW is supplied to the first scan line SL1*i*, the second transistor M2 is turned on. When the second transistor M2 is turned on, the data voltage Vdata of the data signal from the data line DLj is supplied to the third node N3.

When the second scan signal GB is supplied to the second scan line SL2*i*, the fourth transistor M4 is turned on. When the fourth transistor M4 is turned on, the voltage of the initialization power source Vint is supplied to the second node N2. When the voltage of the initialization power source Vint is supplied to the second node N2, the light emitting element LD may be initialized.

During the second period T2*a*, the supply of the first scan signal GW to the first scan line SL1*i* is suspended and, accordingly, the second transistor M2 is turned off. During the second period T2*a*, the turn-on state of the fourth transistor M4 may be maintained by the second scan signal GB supplied to the second scan line SL2*i*. During the second period T2*a*, the third transistor M3 may be turned off by the emission control signal EM supplied to the emission control line ELk.

After the third transistor M3 is turned off, the voltage of the first node N1 may decrease from the voltage of the first driving power source VDD. The voltage of the third node N3 may also be gradually decreased corresponding to the ratio of the first capacitor C1 and the second capacitor C2. The voltage of the first node N1 may be rapidly decreased as compared with the voltage of the third node N3. When the voltage difference between the first node N1 and the third node N3 becomes the absolute threshold voltage of the first transistor M1, the first transistor M1 may be turned off. The threshold voltage of the first transistor M1 may be stored in the first capacitor C1.

After that, the operation process of the third period T3 and a fourth period T4 is the same as described with reference to FIG. 5, and therefore, detailed descriptions will be omitted.

Figure 13:
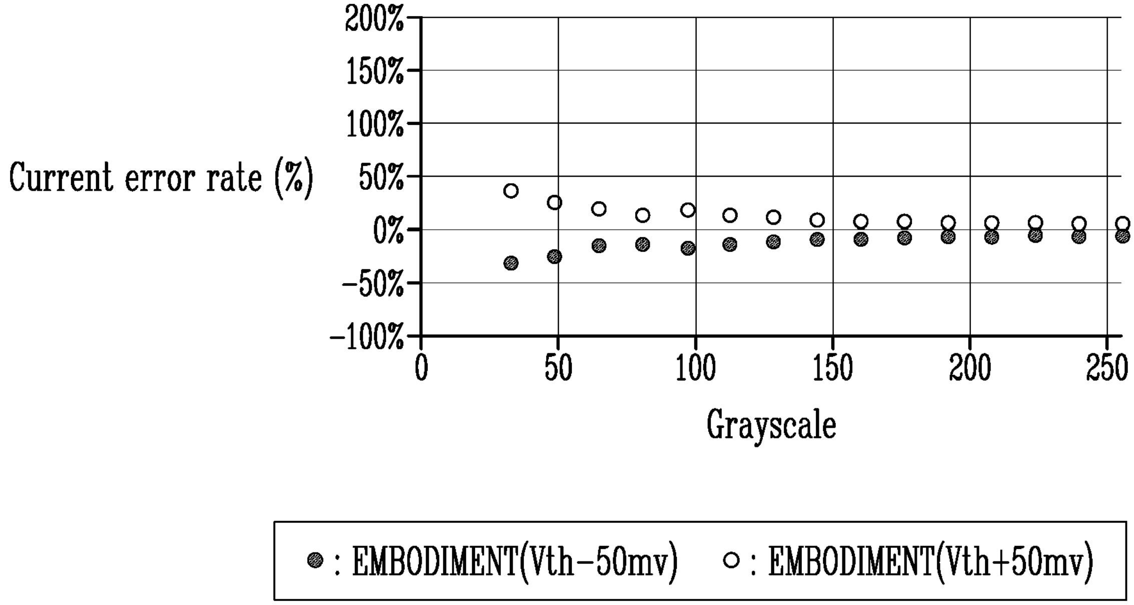
FIG. 13 is a diagram illustrating a current error rate when the pixel shown in FIG. 4 is driven using the driving method shown in FIG. 12.

FIG. 13 is a diagram illustrating a current error rate when the pixel shown in FIG. 4 is driven using the driving method shown in FIG. 12. In FIG. 13, an X axis may represent grayscale, and a Y axis may represent current error rate (%). FIG. 13 may represent a current error rate when the threshold voltage of the first transistor M1 is changed to ±50 mV.

Referring to FIG. 13, when the threshold voltage of the first transistor M1 included in the pixel PXij is changed to 50 mV, the current error rate may be approximately 35% or less. When the threshold voltage of the first transistor M1 included in the pixel PXij is changed to −50 mV, the current error rate may be approximately −35% or less. That is, it can be seen that when the pixel shown in FIG. 4 is driven using the driving method shown in FIG. 12, the threshold voltage of the first transistor M1 is compensated. In the embodiment of the present disclosure, because the pixel PXij includes a driving transistor (i.e., the first transistor M1) having a body electrode, the threshold voltage can be compensated, and accordingly, the pixel PXij can be applied to a high-resolution panel.

Figure 14:
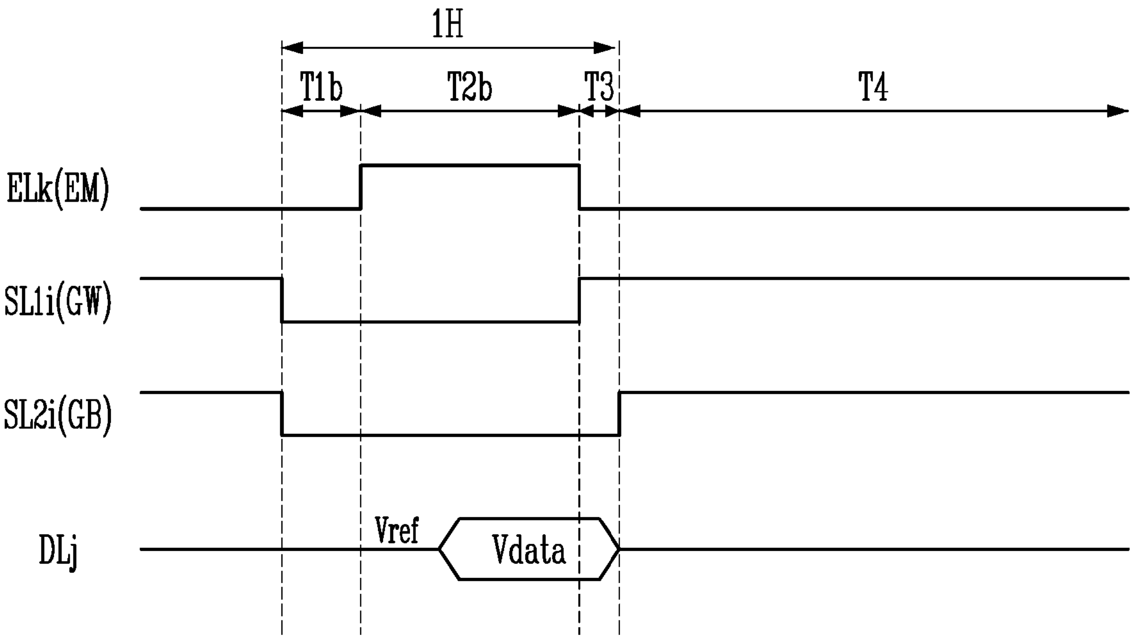
FIG. 14 is a waveform diagram illustrating an embodiment of a driving method of the pixels shown in FIGS. 4, 9, and 11.

FIG. 14 is a waveform diagram illustrating an embodiment of a driving method of the pixels shown in FIGS. 4, 9, and 11. In FIG. 14, an operation process will be described in conjunction with the pixel PXij shown in FIG. 4. In FIG. 14, portions overlapping with those shown in FIG. 5 will be omitted.

Referring to FIG. 14, a horizontal period 1H (or specific horizontal period) may include a first period T1*b*, a second period T2*b*, and a third period T3.

The data driver 140 may supply a voltage of a reference power source Vref to the data line DLj during the first period T1*b* and a portion of the second T2*b*, and supply the data voltage Vdata of the data signal to the data line DLj during the rest of the second period T2*b* and the third period T3. The voltage of the reference voltage Vref may be set to a voltage higher than 0V.

The operation process will be described in conjunction with FIGS. 4 and 14. During the first period T1*b*, the first scan signal GW is supplied to the first scan line SL1*i*, and the second scan signal GB is supplied to the second scan line SL2*i*. Also, during the first period T1*b*, the emission control signal EM is not supplied to the emission control line ELk, and accordingly, the third transistor M3 is set to be in the turn-on state. When the third transistor M3 is turned on, the voltage of the first driving power source VDD is supplied to the first node N1.

When the second scan signal GB is supplied to the second scan line SL2*i*, the fourth transistor M4 is turned on. When the fourth transistor M4 is turned on, the voltage of the initialization power source Vint may be supplied to the second node N2.

When the first scan signal GW is supplied to the first scan line SL1*i*, the second transistor M2 is turned on. When the second transistor M2 is turned on, the voltage of the reference power source Vref from the data line DLj is supplied to the third node N3. When the voltage of the reference power source Vref is supplied to the third node N3, the first capacitor C1 and the second capacitor C2 may be initialized by the voltage of the reference power source Vref.

In an example, the first capacitor C1 may be initialized by the voltage of the reference power source Vref and the voltage of the first driving power source VDD. In an example, the second capacitor C2 may be initialized by the voltage of the reference power source Vref and the voltage of the initialization power source Vint.

During the second period T2*b*, the turn-on state of the second transistor M2 may be maintained by the first scan signal GW supplied to the first scan line SL1*i*, and the turn-on state of the fourth transistor M4 may be maintained by the second scan signal GB supplied to the second scan line SL2*i*.

Also, during the second period T2*b*, the third transistor M3 may be turned off by the emission control signal EM supplied to the emission control line ELk. When the third transistor M3 is turned off, the first power line PL1 and the first node N1 is electrically disconnected.

Since the second transistor M2 is set to be in the turn-on state during the second period T2*b*, the voltage of the third node N3 may be changed to the data voltage Vdata of the data signal. The voltage of the first node N1 may decrease from the voltage of the first driving power source VDD to the voltage (Vdata+|Vth(M1)|) obtained by adding the absolute threshold voltage of the first transistor M1 to the data voltage Vdata of the data signal. During the second period T2*b*, the threshold voltage of the first transistor M1 may be stored in the first capacitor C1.

After that, the operation process of the third period T3 and a fourth period T4 is the same as described with reference to FIG. 5, and therefore, detailed descriptions will be omitted.

Figure 15:
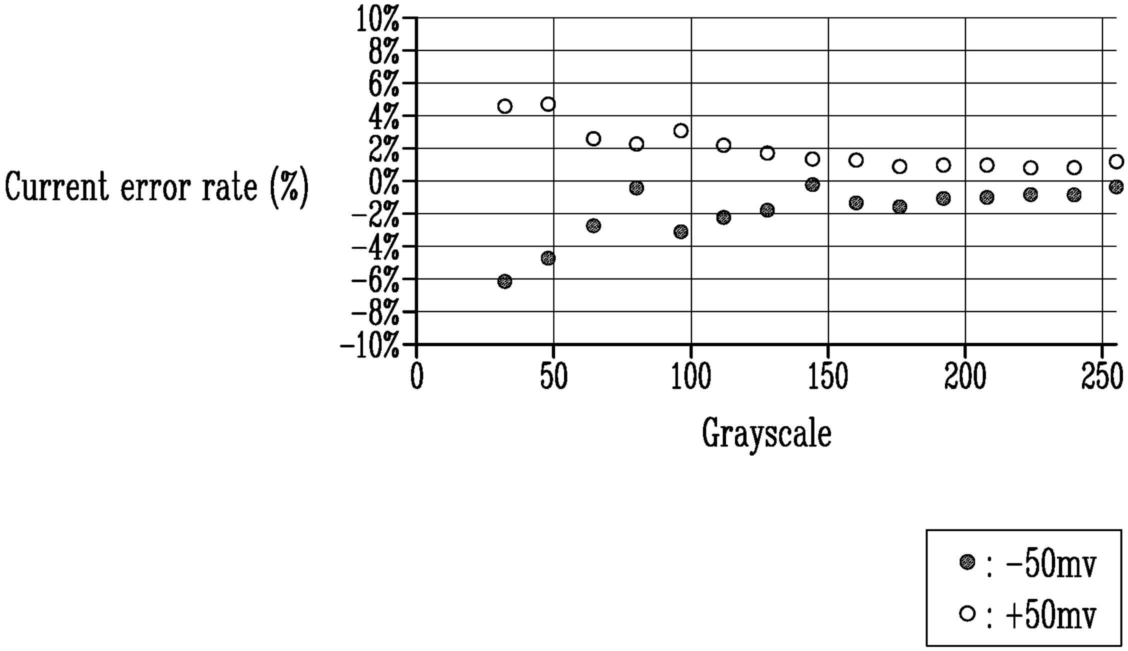
FIG. 15 is a diagram illustrating a current error rate when the pixel shown in FIG. 4 is driven using the driving method shown in FIG. 14.

FIG. 15 is a diagram illustrating a current error rate when the pixel shown in FIG. 4 is driven using the driving method shown in FIG. 14. In FIG. 15, an X axis may represent grayscale, and a Y axis may represent current error rate (%). FIG. 15 may represent a current error rate when the threshold voltage of the first transistor M1 is changed to ±50 mV.

Referring to FIG. 15, when the threshold voltage of the first transistor M1 included in the pixel PXij is changed to 50 mV, the current error rate may be approximately 4.3% or less. When the threshold voltage of the first transistor M1 included in the pixel PXij is changed to −50 mV, the current error rate may be approximately −6% or less. That is, it can be seen that when the pixel shown in FIG. 4 is driven using the driving method shown in FIG. 14, the threshold voltage of the first transistor M1 is compensated. In the embodiment of the present disclosure, because the pixel PXij includes a driving transistor (i.e., the first transistor M1) having a body electrode, the threshold voltage can be compensated, and accordingly, the pixel PXij can be applied to a high-resolution panel.

Figure 16:
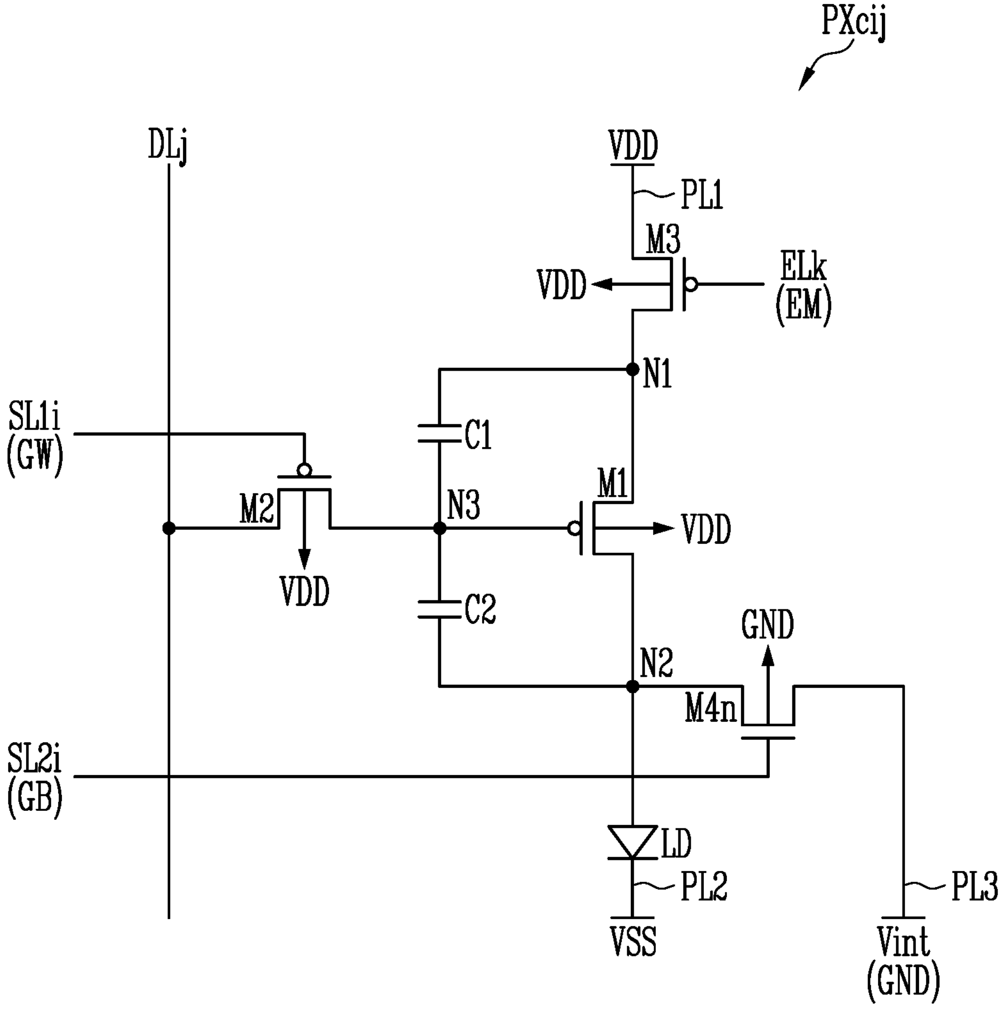
FIG. 16 is a diagram illustrating an embodiment of the pixel shown in FIG. 2.
Figure 17:
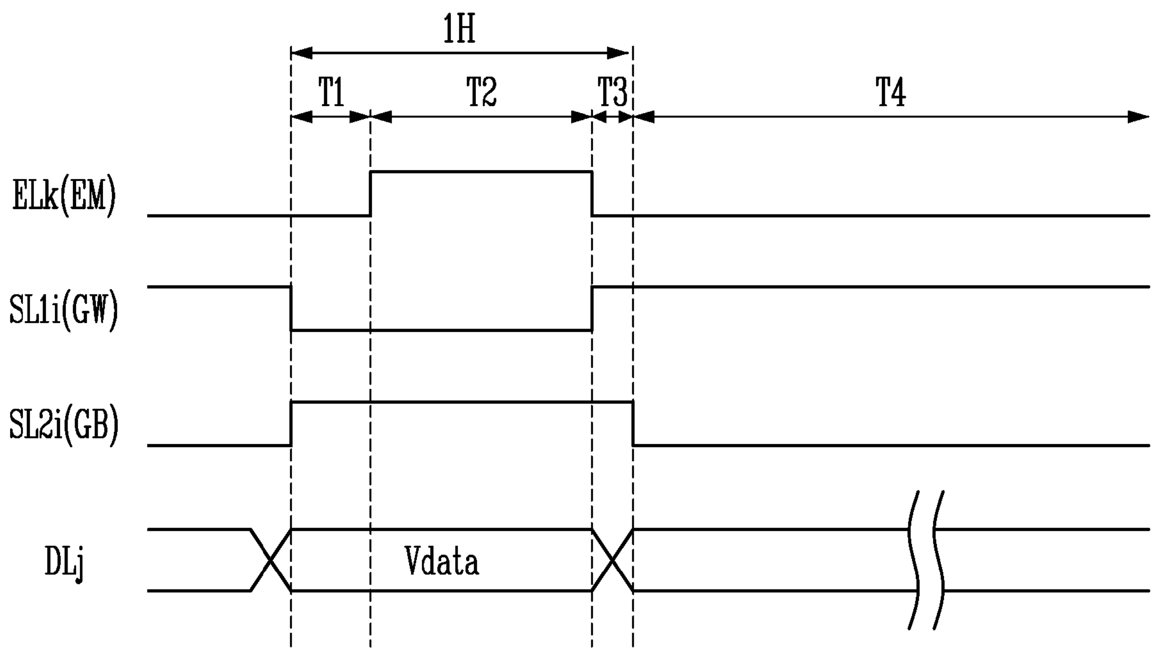
FIG. 17 is a waveform diagram illustrating a driving method of the pixel shown in FIG. 16.

FIG. 16 is a diagram illustrating an embodiment of the pixel shown in FIG. 2. FIG. 17 is a waveform diagram illustrating a driving method of the pixel shown in FIG. 16. In FIG. 16, components identical to those shown in FIG. 4 are designated by like reference numerals, and overlapping descriptions will be omitted.

Referring to FIG. 16, a pixel PXcij in accordance with an embodiment of the present disclosure may be connected to corresponding signal lines SL1*i*, SL2*i*, ELk, and DLj. For example, the pixel PXcij may be connected to an ith first scan line SL1*i*, an ith second scan line SL2*i*, a kth emission control line ELk, and a jth data line DLj. In an embodiment, the pixel PXcij may be further connected to a first power line PL1, a second power line PL2, and a third power line PL3.

The pixel Pxcij in accordance with the embodiment of the present disclosure may include a light emitting element LD and a pixel circuit for controlling an amount of current supplied to the light emitting element LD.

The light emitting element LD may be connected between the first power line PL1 and the second power line PL2. The light emitting element LD may generate light with a predetermined luminance, corresponding to an amount of current supplied from the first power line PL1 to the second power line PL2 via the pixel circuit.

The pixel circuit may include a first transistor M1, a second transistor M2, a third transistor M3, a fourth transistor M4*n*, a first capacitor C1, and a second capacitor C2.

A first electrode of the fourth transistor M4*n* may be connected to a second node N2, and a second electrode of the fourth transistor M4*n* may be electrically connected to the third power line PL3. In addition, a gate electrode of the fourth transistor M4*n* may be electrically connected to the second scan line SL2*i*. The fourth transistor M4*n* may be turned on when a second scan signal GB is supplied to the second scan line SL2*i*, to electrically connect the second node N2 and the third power line PL3 to each other.

In an embodiment of the present disclosure, the fourth transistor M4*n* may be set as an N-type transistor. In an example, the fourth transistor M4 shown in FIG. 4 may be set as a P-type transistor, and the fourth transistor M4*n* shown in FIG. 16 may be set as the N-type transistor. An operation process of the pixel PXcij shown in FIG. 16 may be substantially identical to the operation process of the pixel PXij shown in FIG. 4, only except that the fourth transistor M4*n* is set as the N-type transistor. However, the polarity of the second scan signal GB supplied to the second scan line SL2*i* may be reversed as shown in FIG. 17, corresponding to the N-type fourth transistor M4*n*. In an example, the second scan signal GB having a high level may be supplied to the second scan line SL2*i*. A body electrode of the fourth transistor M4*n* set as the N-type transistor may be supplied with a ground potential GND. The ground potential GND may also be supplied to the third power line PL3. In an example, the voltage of the initialization power source Vint may be set to the ground potential. In an example, the voltage of the initialization power source Vint may be set to the ground potential GND. In the pixel PXcij in accordance with the embodiment of the present disclosure, the body electrode of the fourth transistor M4*n* may be set to a voltage equal to a voltage supplied to the third power line PL3. Thus, when the fourth transistor M4*n* is set as the N-type transistor, an increase in a voltage of the second node N2 can be prevented, and accordingly a black luminance can be stably implemented.

Specifically, when the fourth transistor M4 is set as the P-type transistor as shown in FIG. 4, the voltage of the first electrode (e.g., the source electrode) (e.g., the second node N2) and the voltage of the body electrode of the fourth transistor M4 may be differently set when the fourth transistor M4 is turned on. In an example, the voltage of the first electrode of the fourth transistor M4 may be set as a voltage lower than the voltage of the first driving power source VDD supplied to the body electrode of the fourth transistor M4. A value (e.g., Vb−Vs) obtained by subtracting the voltage (e.g., Vs) of the first electrode from the voltage (e.g., Vb) of the body electrode may be set to a voltage higher than 0V.

When the value obtained by subtracting the voltage of the first electrode from the voltage of the body electrode is set to the voltage higher than 0V, a threshold voltage of the fourth transistor M4 may be increased, and accordingly, the voltage of the second node N2 may be increased. When the voltage of the second node N2 is increased, the black luminance may be increased.

On the other hand, when the fourth transistor M4*n* is set as the N-type transistor as shown in FIG. 16, the body electrode and a source electrode of the fourth transistor M4*n* may be set to the same voltage (i.e., the ground potential GND). Thus, although the fourth transistor M4*n* is turned on, a threshold voltage of the fourth transistor M4*n* maintains a certain voltage (i.e., is not increased), and accordingly, an increase in the black luminance can be prevented. That is, when the fourth transistor M4*n* is set as the N-type transistor, the black luminance can be stably implemented.

In the pixel and the display device including the same in accordance with the present disclosure, the pixel can be implemented using a transistor (e.g., a MOSFET) suitable for high resolution.

In accordance with the present disclosure, the pixel includes a driving transistor having a body electrode and, accordingly, a threshold voltage of the driving transistor can be stably compensated.

Also, in accordance with the present disclosure, the pixel can widely set a voltage range of a data signal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A pixel comprising:

a first transistor including a first electrode connected to a first node, a second electrode connected to a second node, and a gate electrode connected to a third node;

a second transistor connected between a data line and the third node, the second transistor including a gate electrode electrically connected to a first scan line;

a third transistor connected between a first power line to which a voltage of a first driving power source is supplied and the first node, the third transistor including a gate electrode electrically connected to an emission control line;

a fourth transistor including a first electrode connected to the second node, a second electrode electrically connected to a second power line to which a voltage of an initialization power source is supplied, and a gate electrode electrically connected to a second scan line;

a first capacitor connected between the first node and the third node;

a second capacitor connected between the second node and the third node; and a light emitting element connected between the second node and a third power line to which a voltage of a second driving power source is supplied, wherein one horizontal period includes a first period, a second period, and a third period which controls amount of current supplied to the initialization power source from the first driving power source, and wherein the third transistor and the fourth transistor are simultaneously set to be in a turn-on state and the second transistor is set to be in a turn-off state in the third period.

2. The pixel of claim 1, wherein the light emitting element is turned off when the voltage of the initialization power source is supplied to the second node.

3. The pixel of claim 1, wherein the third power line is the same power line as the second power line, and the initialization power source is the same power source as the second driving power source.

4. The pixel of claim 1, wherein the voltage of the first driving power source is supplied to the body electrode of each of the first transistor, the second transistor, the third transistor and the fourth transistor.

5. The pixel of claim 1, wherein the body electrode of the first transistor is electrically connected to the first node, and the voltage of the first driving power source is supplied to the body electrode of each of the second transistor, the third transistor and the fourth transistor.

6. The pixel of claim 1, wherein the fourth transistor is set as an N-type transistor, and a voltage equal to a voltage supplied to the third power line is supplied to the body electrode of the fourth transistor.

7. The pixel of claim 1, wherein, throughout the first period, the second transistor, the third transistor, and the fourth transistor are set to be in the turn-on state, wherein, throughout the second period, the second transistor and the fourth transistor are set to be in the turn-on state, and the third transistor is set to be in the turn-off state, and wherein, throughout the third period, the third transistor and the fourth transistor are set to be in the turn-on state, and the second transistor is set to be in the turn-off state.

8. The pixel of claim 7, wherein a voltage of a data signal is supplied to the data line during the first period, the second period and the third period.

9. The pixel of claim 7, wherein a voltage of a reference power source is supplied to the data line during the first period and a portion of the second period, and a voltage of a data signal is supplied to the data line during the rest of the second period and the third period.

10. The pixel of claim 1, wherein, throughout the first period, the second transistor, the third transistor, and the fourth transistor are set to be in the turn-on state, wherein, throughout the second period, the fourth transistor is set to be in the turn-on state, and the second transistor and the third transistor are set to be in the turn-off state, wherein, throughout the third period, the third transistor and the fourth transistor are simultaneously set to be in the turn-on state, and the second transistor is set to be in the turn-off state, and wherein a voltage of a data signal is supplied to the data line during the first period, the second period and the third period.

11. A display device comprising:

pixels connected to first scan lines, second scan lines, data lines, and emission control lines;

wherein a pixel located on an ith (i is an integer of 0 or more) pixel row and a jth (j is an integer of 0 or more) pixel column includes:

a first transistor including a first electrode connected to a first node, a second electrode connected to a second node, and a gate electrode connected to a third node;

a second transistor connected to a jth data line and the third node, the second transistor being turned on when a first scan signal is supplied to an ith first scan line;

a third transistor connected between a first power line to which a voltage of a first driving power source is supplied and the first node, the third transistor being turned off when an emission control signal is supplied to a kth (k is an integer of 0 or more) emission control line;

a fourth transistor including a first electrode connected to the second node and a second electrode electrically connected to a third power line to which a voltage of an initialization power source is supplied, the fourth transistor being turned on when a second scan signal is supplied to an ith second scan line;

a first capacitor connected between the first node and the third node;

a second capacitor connected between the second node and the third node; and a light emitting element connected between the second node and a second power line to which a voltage of a second driving power source is supplied, wherein one horizontal period in which the pixel located on the ith pixel row and the jth pixel column is driven includes a first period, a second period, and a third period which controls amount of current supplied to the initialization power source from the first driving power source, and wherein the third transistor and the fourth transistor are simultaneously set to be in a turn-on state and the second transistor is set to be in a turn-off state in the third period.

12. The display device of claim 11, wherein the third power line is the same power line as the second power line, and the initialization power source is the same power source as the second driving power source.

13. The display device of claim 11, wherein the voltage of the first driving power source is supplied to the body electrode.

14. The display device of claim 11, wherein each of the first transistor, the second transistor, the third transistor and the fourth transistor is a MOSFET including a body electrode, the body electrode of the first transistor is electrically connected to the first node, and the voltage of the first driving power source is supplied to the body electrode of each of the second transistor, the third transistor and the fourth transistor.

15. The display device of claim 11, wherein the display device further comprises:

a first scan driver configured to supply the first scan signal to the ith first scan line throughout the first period and the second period;

a second scan driver configured to supply the second scan signal to the ith second scan line throughout the first period, the second period and the third period; and an emission driver configured to supply the emission control signal to the kth emission control line throughout the second period.

16. The display device of claim 15, further comprising a data driver configured to supply a voltage of a data signal to the jth data line during the first period, the second period and the third period.

17. The display device of claim 15, further comprising a data driver configured to supply a voltage of a reference power source to the jth data line during the first period and a portion of the second period, and supply a voltage of a data signal to the jth data line during the rest of the second period and the third period.

18. The display device of claim 11, wherein the display device further comprises:

a first scan driver configured to supply the first scan signal to the ith first scan line throughout the first period;

a second scan driver configured to supply the second scan signal to the ith second scan line throughout the first period, the second period and the third period;

an emission driver configured to supply the emission control signal to the kth emission control line throughout the second period; and a data driver configured to supply a voltage of a data signal to the jth data line during the first period, the second period and the third period.

19. An electronic device comprising:

a host system, and a display device, the display device comprising:

a first transistor including a first electrode connected to a first node, a second electrode connected to a second node, and a gate electrode connected to a third node;

a second transistor connected between a data line and the third node, the second transistor including a gate electrode electrically connected to a first scan line;

a third transistor connected between a first power line to which a voltage of a first driving power source is supplied and the first node, the third transistor including a gate electrode electrically connected to an emission control line;

a fourth transistor including a first electrode connected to the second node, a second electrode electrically connected to a second power line to which a voltage of an initialization power source is supplied, and a gate electrode electrically connected to a second scan line;

a first capacitor connected between the first node and the third node;

a second capacitor connected between the second node and the third node; and a light emitting element connected between the second node and a third power line to which a voltage of a second driving power source is supplied, wherein one horizontal period includes a first period, a second period, and a third period which controls an amount of current supplied to the initialization power source from the first driving power source, and wherein the third transistor and the fourth transistor are simultaneously set to be in a turn-on state and the second transistor is set to be in a turn-off state in the third period.

* * * * *